(12) United States Patent
Hansen

(10) Patent No.: US 12,013,925 B2
(45) Date of Patent: Jun. 18, 2024

(54) AUTHENTICATING PROXIMITY VIA TIME-OF-FLIGHT

(71) Applicant: ams Sensors Singapore Pte. Ltd., Singapore (SG)

(72) Inventor: Bryant Hansen, Zurich (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 215 days.

(21) Appl. No.: 17/618,707

(22) PCT Filed: Jul. 30, 2020

(86) PCT No.: PCT/SG2020/050439
§ 371 (c)(1),
(2) Date: Dec. 13, 2021

(87) PCT Pub. No.: WO2021/021025
PCT Pub. Date: Feb. 4, 2021

(65) Prior Publication Data
US 2022/0300595 A1 Sep. 22, 2022

Related U.S. Application Data

(60) Provisional application No. 62/880,258, filed on Jul. 30, 2019.

(51) Int. Cl.
*G06F 21/35* (2013.01)
(52) U.S. Cl.
CPC .................. *G06F 21/35* (2013.01)
(58) Field of Classification Search
CPC ... G06F 21/35; H04W 12/069; H04W 12/122; H04W 12/61; H04W 12/63; G07C 2009/00555; G07C 2209/63; G07C 9/00309; G07C 2009/00412
See application file for complete search history.

(56) References Cited

U.S. PATENT DOCUMENTS

| | | | |
|---|---|---|---|
| 5,928,293 A | 7/1999 | Jobling et al. | |
| 7,039,190 B1* | 5/2006 | Engwer | H04L 9/3271 380/247 |
| 2009/0132828 A1* | 5/2009 | Kiester | H04L 9/3247 713/185 |
| 2012/0212366 A1 | 8/2012 | Alalusi | |
| 2014/0340193 A1 | 11/2014 | Zivkovic et al. | |
| 2015/0276924 A1 | 10/2015 | Zheng | |
| 2016/0363664 A1 | 12/2016 | Mindell et al. | |

(Continued)

FOREIGN PATENT DOCUMENTS

| CN | 104183036 A | 12/2014 |
|---|---|---|
| CN | 104424779 A | 3/2015 |

(Continued)

OTHER PUBLICATIONS

International Search Report for corresponding International Application No. PCT/SG2020/050439, dated Oct. 27, 2020.

(Continued)

*Primary Examiner* — Quazi Farooqui
(74) *Attorney, Agent, or Firm* — VIERING, JENTSCHURA & PARTNER mbB

(57) ABSTRACT

The disclosure describes systems and methods for wirelessly authenticating devices based on proximity using time-of-flight.

19 Claims, 11 Drawing Sheets

(56) References Cited

U.S. PATENT DOCUMENTS

| | | |
|---|---|---|
| 2017/0063549 A1 | 3/2017 | Zwart et al. |
| 2017/0187721 A1 | 6/2017 | Raynor |
| 2017/0272906 A1 | 9/2017 | Kerai |
| 2018/0007507 A1 | 1/2018 | Ghabra et al. |
| 2018/0093642 A1 | 4/2018 | Casagrande et al. |
| 2018/0189470 A1* | 7/2018 | Kim .................... G06F 21/316 |
| 2018/0367994 A1 | 12/2018 | Danev |
| 2019/0061686 A1 | 2/2019 | Neuhoff et al. |
| 2019/0074973 A1* | 3/2019 | Hadaschik ......... G07C 9/00309 |
| 2019/0116619 A1 | 4/2019 | Hauck et al. |
| 2019/0118767 A1 | 4/2019 | Britt |

FOREIGN PATENT DOCUMENTS

| | | |
|---|---|---|
| CN | 108235291 A | 6/2018 |
| CN | 108698561 A | 10/2018 |
| EP | 1152108 A2 | 11/2001 |
| JP | H10308731 A | 11/1998 |
| JP | 2017512044 A | 4/2017 |
| KR | 20180123091 A | 11/2018 |
| WO | 2016059451 A1 | 4/2016 |

OTHER PUBLICATIONS

Office Action issued from the Taiwan Patent Office for related Application No. 109125858 dated May 27, 2021 (6 pages including statement of relevance).

Korean Office Action issued for the corresponding Korean patent application No. 1020217042235, dated Oct. 29, 2023, 8 pages (for informational purposes only).

Chinese Office Action issued for the corresponding CN patent application No. CN 202080047066, dated Oct. 26, 2023, 6 pages (For informational purposes only).

* cited by examiner

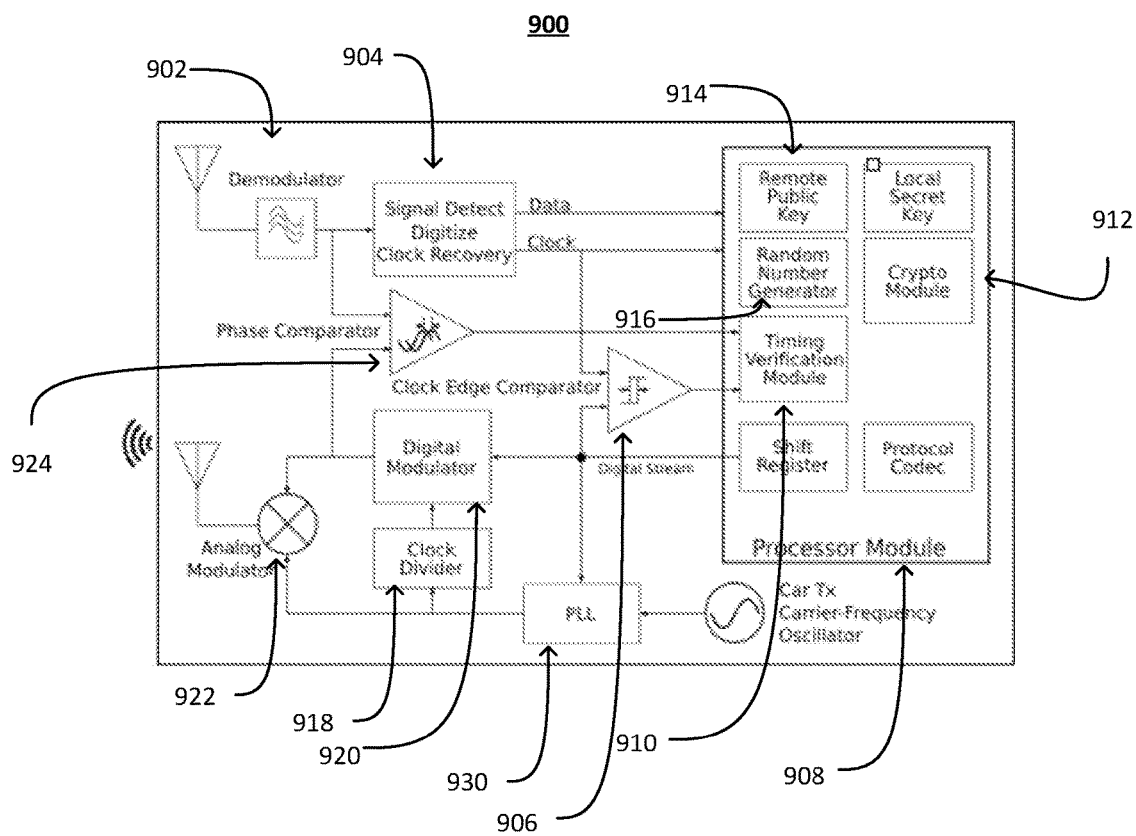
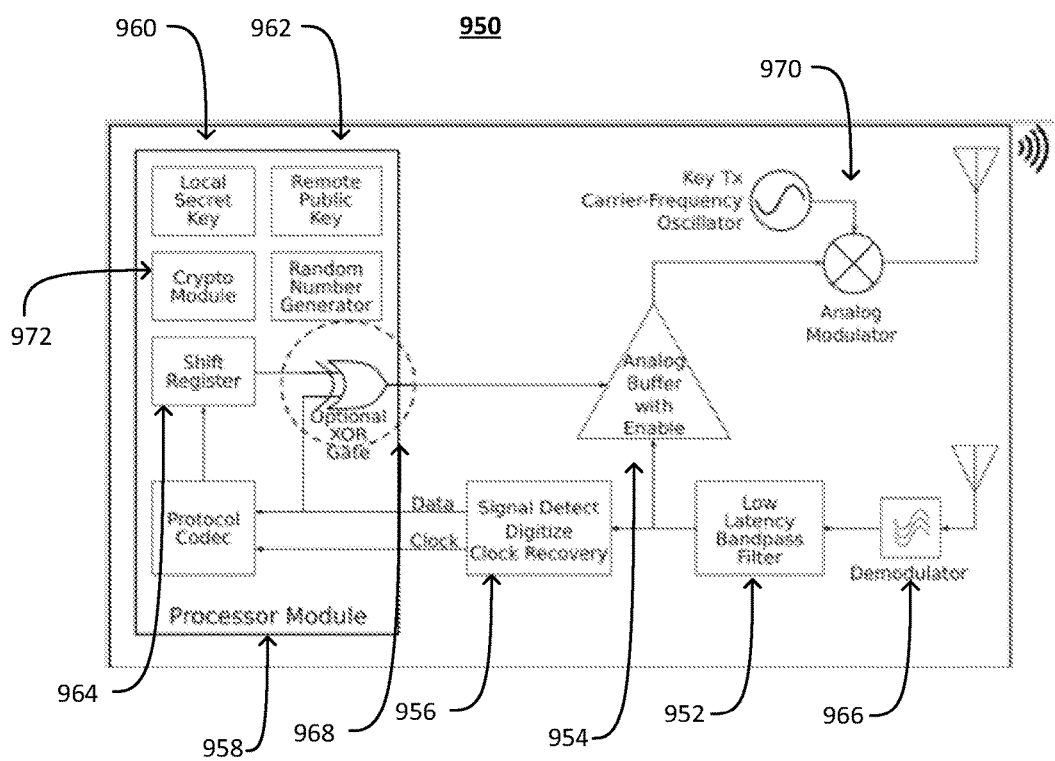
FIG. 9

AUTHENTICATING PROXIMITY VIA TIME-OF-FLIGHT

FIELD OF THE DISCLOSURE

This disclosure relates to authenticating proximity using time-of-flight techniques.

BACKGROUND

Wireless Passive Key Entry ("PKE") is an increasingly-common technology for secure access to various resources. One prominent and growing use case is in the automobile market. Millions of vehicles are produced worldwide with Wireless PKE as a high-end feature. Wireless PKE does not require the user to take the key out of their pocket or handbag and physically insert it into the lock. The lock simply detects that the key is present and unlocks automatically. One problem is that these keys can be defeated with currently available technology. Whether the key is present is usually determined based on signal attenuation. Bad actors use repeaters to bridge the signal over a longer range to defeat electronic keys, enabling these actors to, for example, steal a vehicle. This is referred to as a Relay Attack.

SUMMARY

One way to defeat a Relay Attack is to authenticate proximity of the device (e.g., a key fob or an electronic key) attempting access (e.g., attempting to access a vehicle). This disclosure describes authenticating proximity by verifying time-of-flight of signals (e.g., radio frequency signals) between an electronic key and a corresponding electronic lock. In some implementations, a system to authenticate proximity may use a transceiver and control circuitry coupled to the transceiver. This disclosure will refer to such system as an authentication system. In some implementations, the authentication system generates an authentication sequence on a first device. For example, the authentication system may include a first device that is part of a vehicle (e.g., a module built into the vehicle). In some implementations, the authentication sequence is a randomly generated sequence of bits (e.g., ones and zeroes). In some implementations, the authentication sequence is a randomly generated string of alphanumeric characters.

The authentication system is operable to encrypt the authentication sequence, and to transmit, using the transceiver, the encrypted authentication sequence to a second device. For example, the authentication system may use a public/private key infrastructure ("PKI") to perform the encryption operation. In some implementations, the second device is an electronic key fob that can be used to access a vehicle. The key fob includes control circuitry, a transceiver, memory, and other components. In some implementations, instead of using PKI the authentication system uses a single key for encrypting/decrypting data. For example, the key can be generated when the first device and the second device are paired. The first device (e.g., a vehicle) and a second device (e.g., an electronic key) may be paired at the factory, a dealer, or at another suitable location/time.

The authentication system receives, in the transceiver from the second device, an encrypted return sequence and decrypts the encrypted return sequence. In some implementations, the second device has been paired with the first device and includes a public key of the first device. The first device uses its private key to decrypt the encrypted return sequence. As discussed above, in some implementations, the first device is a vehicle and the second device is an electronic key (e.g., a key fob) that the vehicle authenticates to, for example, open the doors or otherwise access and drive the vehicle. In some implementations, the encryption/decryption system uses a single key instead of a public/private key infrastructure.

The authentication system receives, sequentially, a first set of portions of the unencrypted authentication sequence and transmits, sequentially, to the second device, a second set of portions of the unencrypted return sequence. In some implementations, the receiving and transmitting operations are performed as follows. The first device transmits the first portion of the unencrypted return sequence and records the transmission time. The second device receives the first portion of the return sequence and compares the portion with a corresponding portion of the return sequence as stored on the second device. If the comparison is successful, the second device transmits the first portion of the unencrypted authentication sequence to the first device.

The authentication system is operable to determine, based on a time-of-flight measurement for each portion of the authentication sequence, whether the second device is within a threshold distance of the first device. In some implementations, the authentication system uses propagation delay and/or phase shift of the return signal to determine time-of-flight. Based on the time-of-flight, the authentication system determines the distance between the first device and the second device. The authentication system compares the distance calculated based on the time-of-flight with the threshold distance to determine whether the second device is within a threshold distance of the first device. For example, if based on the time-of-flight, the authentication system determines that the second device is fifty meters away from the first device and the threshold distance is five meters, the authentication system indicates a failure to authenticate.

Subsequently, the authentication system receives a portion of the authentication sequence. That is, the authentication system receives a portion of the unencrypted authentication sequence (i.e., a portion of the authentication sequence that the second device decrypted). For example, the authentication system receives the next bit (or the first bit if the receive/transmit operation just started) from the second device. The authentication system stores the received portion in memory, and compares the time associated with the transmission of the previous portion of the return sequence to a time when the portion of authentication sequence was received.

The authentication system determines, based on the distance, whether the second device is within the threshold distance of the first device. If the authentication system is part of a vehicle access system, the threshold distance can be set at the factory, at the dealership, or by a purchaser of the vehicle. The threshold setting may be different for different implementations. For example, for a vehicle, the threshold distance may be three meters, while for a home's front door the threshold distance may be fifteen meters.

The authentication system also compares each portion of the originally-generated authentication sequence to a corresponding received portion in the authentication sequence, and determines whether each portion of the of the originally-generated authentication sequence matches the corresponding received portion. That is, in addition to a distance determination, the authentication system compares the received portion (e.g., bit, number, character, or another suitable portion) with the corresponding originally-generated portion of the authentication sequence.

Based on determining that each portion of the originally-generated authentication sequence matches a corresponding received portion in the authentication sequence and the second device is within the threshold distance of the first device, the authentication system generates an authentication success indication. In some implementations, the authentication system causes the vehicle's doors to open, or if the authentication system is part of a home, opens the front door, the back door, or causes performance of another suitable operation. A person skilled in the art would understand that the authentication system can be used in various contexts. For example, if a user is attempting to perform a financial transaction or exchange other types of sensitive information, proximity authentication can be used to facilitate a transaction.

In some implementations, the second device (e.g., an electronic key) performs essentially the same operations as the first device, but with the return sequence. That is, the second device receives portions of the unencrypted return sequence (i.e., unencrypted by the first device). The second device compares the received portions of the return sequence with the originally-generated portions of the return sequence. If the comparison operation is successful (i.e., the portions match), the second device transmits the next portion to the first device. In some implementations, the second device also perform time-of-flight measurements for the received portions and only sends the next portion if the first device is within a threshold distance of the second device.

In some implementations, the authentication system generates an authentication failure indication based on determining that the second device is not within the threshold distance of the first device. For example, if the time-of-flight measurement yield a distance that is greater than the threshold distance, the authentication system indicates (e.g., to other modules of the first device and/or to the second device) that authentication has failed and denies access (e.g., do not allow access to the vehicle). That is, if all the portions of the originally-generated authentication sequence do not match the received portions of the authentication sequence decrypted by the second device, the authentication system indicates an authentication failure.

In some implementations, authentication system transmits one of the authentication failure indication or the authentication success indication to the second device. For example, the vehicle transmits an authentication failure to the electronic key, and the electronic key restarts the authentication process. In some implementations, the authentication system also transmits a success indication to the second device (e.g., the electronic key). A successful authentication enables the electronic key to transmit commands to the authentication system. For a vehicle, those commands include, lock doors, unlock doors, open windows, and other suitable commands.

In some implementations, the authentication system generates an alphanumeric sequence (e.g., an alphanumeric string) as an authentication sequence, and converts the alphanumeric sequence into a first bit string. That is, the operation of transmitting and receiving portions of the authentication sequence and the return sequence will involve a bit-by-bit transfer and compare operations. Thus, the first device receives, sequentially from the second device, bits of the decrypted authentication sequence and transmits bits of the return sequence bit-by-bit.

In some implementations the authentication system determines, based on the time-of-flight measurement of the selected portion of the authentication sequence, whether the second device is within a threshold distance by calculating either propagation delay or phase shift of the signals.

In some implementations, the authentication system pairs the first device with the second device. To pair the first and second devices, the authentication system generates, on the first device, a second authentication sequence. For example, the authentication system generates an alphanumeric, hexadecimal, or binary authentication sequence (e.g., string). The authentication system transmits the second authentication sequence to the second device, and stores the second authentication sequence at the first device. In some implementations, the authentication system stores the second authentication sequence for later use (e.g., to verify the authenticity of the second device). The second device receive the authentication sequence and stores it for later use as well.

In some implementations, the authentication system uses the second authentication sequence in the authentication process. That is, the authentication system compares each portion to a corresponding portion in the authentication sequence using the second authentication sequence stored at both the first device and the second device. When comparing each portion (e.g., each bit) received the authentication system may calculate an 'exclusive or' ("XOR") value of each received portion of the authentication sequence and a corresponding portion of the second authentication sequence. For example, the second device, prior to transmitting the appropriate bit to the first device, performs an XOR operation on the portion (e.g., a bit) of second authentication sequence and the decrypted bit of the authentication sequence originally received from the first device. The authentication system compares the XOR value with the corresponding portion (e.g., bit) of the authentication sequence.

In some implementations, the control circuitry generates the second authentication sequence during the authentication process. The control circuitry transmits portions of the second authentication sequence to the second device. The second device performs an XOR operation of a received portion of the second authentication sequence and a corresponding portion of the decrypted authentication sequence. The result is transmitted to the first device. The control circuitry compares the received portion with a value corresponding to an XOR operation of the corresponding bits of the authentication sequence and the second authentication sequence stored on the first device.

In some implementations, the authentication system uses low latency reflection of a modulated signal to avoid processing delays. In these and other implementations, the authentication system includes a transceiver and control circuitry coupled with the transceiver. Each time a device is attempting authentication, the authentication system generate a new authentication sequence. In some implementations, the first device generates the authentication sequence using a random number generator. The authentication system encrypts, at a first device with a public key of a second device, a first authentication sequence generated on the first device. Although, some implementations of this disclosure recite PKI as the method of encryption/decryption, PKI is just exemplary. Other available encryption/decryption methods may be used (e.g., identity-based encryption, certificate-less public key cryptography, certificate-based encryption, and other suitable encryption/decryption methods. The authentication sequence may be one of a binary sequence, an alphanumeric sequence, a hexadecimal sequence or another suitable sequence.

The authentication system transmits, using the transceiver, the encrypted first authentication sequence to the second device. The second device decrypts the encrypted first authentication sequence (e.g., using its private key).

When the second device decrypts the first authentication sequence, the second device is ready to perform a bit-by-bit transmit operation.

The authentication system receives, in the transceiver from the second device, a second authentication sequence. In some implementations, the second authentication sequence is encrypted with a public key of the first device. However, the public key encryption is just exemplary. Other encryption/decryption systems can be used, as discussed above. In some implementations, the second device (e.g., an electronic key) generate the second authentication sequence. The second device may use PKI infrastructure or another suitable encryption/decryption method. For example, instead of using public/private keys for encryption/decryption operations, the authentication system may use a single encryption key, one or more encryption certificates. The certificates and/or encryption keys may be distributed during the pairing process. The second device transmits the encrypted second authentication sequence and the authentication system (e.g., on the first device) receives the encrypted second authentication sequence. The authentication system decrypts (e.g., using a private key of the first device) the second authentication sequence. The authentication system may decrypt the second authentication sequence and store it for later use.

The authentication system begins a bit exchange operation to authenticate the second device. The authentication system receives, sequentially on a first modulation frequency bits of the unencrypted first authentication sequence and transmits, sequentially to the second device on a second modulation frequency, bits of the unencrypted second authentication sequence. The transmitting and receiving is performed using the following set of actions.

The authentication system transmits (e.g., using a transceiver), to the second device for each bit of the second authentication sequence, a clock signal and a data signal. The clock signal indicates a portion of the cycle and the data signal indicates a zero or a one bit that is being transmitted. The authentication system receives back a corresponding clock signal from the second device, and determines whether the corresponding clock signal has a corresponding data signal. That is, when the second device receives (e.g., from the first device) the clock signal and the data signal, the second device determine whether the next bit (e.g., of the first decrypted authentication sequence that needs to be sent to the first device) is a zero or a one. If the bit that needs to be sent is a one, the second device repeats the same signal back to the first device as it received (i.e., both the clock signal and the data signal). If the bit that needs to be sent is a zero bit, the second device transmits the same clock signal that it received from the second device without transmitting the data signal back. This type of system enables for a low latency response time (e.g., using a single logic gate).

The authentication system on the first device determines whether it received from the second device just a clock signal or the clock signal and the data signal. In response to determining that the corresponding clock signal has the corresponding data signal, the authentication system sets a return bit of the first plurality of bits to a value of one. In response to determining that the corresponding clock signal does not have the corresponding data signal, the authentication system sets the return bit of the first plurality of bits to a value of zero.

When each bit is received, the authentication system determines an estimated time-of-flight of each return bit of the second authentication sequence based on one or more of a phase difference or propagation delay. Determining the estimated time-of-flight based on the phase difference may comprise determining a phase difference between baseband signals, i.e. basebands. One baseband may be obtained by demodulating a signal transmitted or received on the first modulation frequency, and another baseband may be obtained by demodulating a signal transmitted or received on the second modulation frequency. Determining the phase difference may comprise demodulating bits transmitted and/or received on the first and/or second modulation frequencies to obtain basebands; and determining the phase difference between the obtained basebands.

When time of flight is determined, the authentication system determines, based on the time-of-flight, the distance between the first device and the second device. The authentication system determines, based on the estimated time-of-flight (e.g., based on the determined distance between the first device and the second device), that the second device is within the threshold distance of the first device. For example, if the threshold distance is three feet and the second device is two feet away, the authentication system determines that the second device is within the threshold distance of the first device.

In addition, the authentication system compares each return bit of the second authentication sequence to a corresponding bit of the first authentication sequence. That is, for each received bit of the decrypted first authentication sequence, the authentication system compares the received bit with a corresponding bit in the originally-generated first authentication sequence. The authentication system determines, based on the comparing, whether each bit of the second authentication sequence matches the corresponding bit of the first authentication sequence. For example, the authentication system iterates through each bit (e.g., as those bits are received) and compares those bits with corresponding bits of the originally-generated first authentication sequence. While the received bits match the corresponding bits in the originally-generated first authentication sequence the authentication system continues to match the bits. If a bit does not match, the authentication system indicates authentication failure.

Based on determining that each return bit of the first plurality of bits matches the corresponding bit of the first authentication sequence and the second device is within the threshold distance of the first device (i.e., for each matching bit), the authentication system generates an indication of a successful authentication. For example, as the bits are being received, the authentication system may compare each return bit with the corresponding bits of the originally-generated first authentication sequence and also determine, using time-of-flight information, the distance between the first device and the second device. If both the first device is within the threshold distance of the second device for each return bit and all of the corresponding bits match, the authentication system determines that the authentication system is successful.

When the second device participates in the bit-wise transfer with the first device, the second devices receives a bit (e.g., a clock signal and a data signal), and determines whether the bit is a one or a zero. In some implementations, the second device transmits a bit of the first authentication sequence using the following actions. The second device determines whether the next bit in the second authentication sequence is a one or a zero. If the next bit is a one, the second device transmits back the same clock and data signal to the first device (e.g., on a different modulation frequency), indicating to the first device (i.e., by using the same signal) that the transmitted bit is a one. If the second device needs to transmit a zero, the second device transmits back the clock signal without the data signal. This kind of transmission indicates to the first device that the next bit is a zero.

In some implementations, the authentication system pairs the first device with the second device by performing the following actions. The authentication system generates, for the first device, a first private key and a first public key, and generates, for the second device, a second private key and a second public key. The authentication system stores, at the first device, the first private key and the second public key, and transmits to the second devices and causes the second device to store, at the second device, the second private key and the first public key. In some implementations, the pairing process uses different encryption methods. For example, the authentication system generates one encryption/decryption key and store that key on both the first device and the second device. In yet some implementations, the authentication system generates a certificate for encrypting data or uses other suitable encryption methods.

In some implementations, the authentication system transmits a presence signal with the identification of the first device. That is, the authentication system transmits a presence signal that will indicate to any electronic device that receives the signal that the first device is ready to attempt authentication. If the first device receives a specific signal from another device (e.g., a signal in a specific format), the first device initiates the authentication protocol/method described above. In some implementations, the presence signal includes a string that identifies the first device. The string may be a hexadecimal string, alphanumeric string, or binary string. When the second device receives the presence signal, the second device determines, based on the signal, whether the first device is a paired device or a different device. If the second device determines, based on the presence signal that the first device is a paired device, the second device transmits a signal to the first device requesting authentication (e.g., requesting a start of an authentication sequence discussed above).

In some implementations, the authentication system uses an XOR calculation when performing bit-wise comparisons. Specifically, the authentication system calculates an XOR value between the bit of the second plurality of bits (i.e., a bit of the second authentication sequence) and a corresponding bit in the first plurality of bits (i.e., a bit of the first authentication sequence). The authentication system compares the XOR value with the corresponding received bit. In this implementation, the received bit is also an XOR value of the corresponding bits of the first authentication sequence and the second authentication sequence. The second device may perform an XOR operation prior to transmitting the bit to the first device.

The first and second modulation frequencies are different frequencies. Each of the frequencies may be selected to be integer multiples of a baseband, i.e. the signal to be modulated. The first and second modulation frequencies may be higher frequencies than the baseband signal which is a low frequency signal. For example, the first or second modulation frequency may be 928 MHz and the baseband may be 1 MHz. The baseband may be common for the first and second modulation frequencies.

This may allow for precise alignment of the first and second modulation frequencies with the baseband. This may allow for precise alignment of the first plurality of bits which are received on the first modulated frequency, and the baseband. This may also or alternatively allow for precise alignment of the second plurality of bits which are transmitted on the second modulation frequency, and the baseband. Precise alignment may allow for more precise detection of the propagation delay, i.e. determining where a boundary of a digital bit within a signal should be.

Determining the estimated time-of-flight may comprise at least one of: determining a number of cycles of the first plurality of bits on the first modulation frequency present between cycles of a baseband; determining a number of cycles of the second plurality of bits on the second modulation frequency present between cycles of the baseband; determining a number of features of an interference signal of the first plurality of bits on the first modulation frequency and the second plurality of bits on the second modulation frequency.

Determining the estimated time-of-flight may comprise: determining a number of cycles of the first plurality of bits on the first modulation frequency present between cycles of a baseband; and determining a number of cycles of the second plurality of bits on the second modulation frequency present between cycles of the baseband.

Determining the number of cycles may comprise counting the number of cycles of the first plurality of bits present between cycles of the baseband, and/or counting the number of cycles of the second plurality of bits present between cycles of the baseband.

The features may be one or more of peaks, crests, beats or troughs of an interference signal. Determining the number of features may comprise counting or observing the number of peaks, crests, beats or troughs of the interference signal. The interference signal may be due to constructive interference between the first plurality of bits on the first modulation frequency and the second modulation frequency and the baseband. The constructive interference may be in both the transmitting and receiving directions.

According to an aspect of the disclosure a method is provided. The method comprises: generating, on a first device, an authentication sequence; encrypting the authentication sequence; transmitting, using a transceiver, the encrypted authentication sequence to a second device; receiving, in the transceiver from the second device, an encrypted return sequence; decrypting the encrypted return sequence; receiving, sequentially a first plurality of portions of the unencrypted authentication sequence and transmit, sequentially to the second device, a second plurality of portions of the unencrypted return sequence, wherein transmitting sequentially and receiving sequentially comprises: determining, based on a time-of-flight measurement for each portion of the first plurality of portions, whether the second device is within a threshold distance of the first device; comparing each portion of the first plurality of portions to a corresponding portion in the authentication sequence; and determining whether each portion of the first plurality of portions matches the corresponding portion in the authentication sequence; and based on determining that each portion of the first plurality of portions matches a corresponding portion in the authentication sequence and the second device is within the threshold distance of the first device, generate an authentication success indication.

The method may further comprise generating an authentication failure indication based on determining that the second device is not within the threshold distance of the first device.

The method may further comprise transmitting one of the authentication failure indication or the authentication success indication to the second device.

The method may further comprise generating an authentication failure indication based on determining that each portion of the first plurality of portions does not match the corresponding portion in the authentication sequence.

Generating the authentication sequence may comprise: generating an alphanumeric sequence; and converting the alphanumeric sequence into a first bit string.

Receiving, sequentially from the second device, the plurality of portions of the return sequence may comprise receiving a second bit string.

Pairing the first device with the second device may comprise: generating, on the first device, a second authentication sequence; transmitting the second authentication sequence to the second device; and storing the second authentication sequence at the first device.

Comparing each portion to a corresponding portion in the authentication sequence may comprise: calculating an exclusive or ("XOR") value of each portion of the first plurality of portions and a corresponding portion of the second authentication sequence; and comparing the XOR value with the corresponding portion of the authentication sequence.

According to another aspect of the disclosure a method is provided. The method comprises: encrypting, at a first device with a public key of a second device, a first authentication sequence generated on the first device; transmitting, using a transceiver, the encrypted first authentication sequence to the second device; receiving, from the second device in the transceiver, a second authentication sequence, wherein the second authentication sequence is encrypted with a public key of the first device; decrypting, using a private key of the first device, the second authentication sequence; receiving, sequentially on a first modulation frequency a first plurality of bits of the unencrypted first authentication sequence and transmit, sequentially to the second device on a second modulation frequency, a second plurality of bits of the unencrypted second authentication sequence, wherein transmitting sequentially and receiving sequentially comprises: transmitting, to the second device for each bit of the second plurality of bits, a clock signal and a data signal; receiving a corresponding clock signal from the second device; determining whether the corresponding clock signal has a corresponding data signal; in response to determining that the corresponding clock signal has the corresponding data signal, setting a return bit of the first plurality of bits to a value of one; in response to determining that the corresponding clock signal does not have the corresponding data signal, setting the return bit of the first plurality of bits to a value of zero; determining an estimated time-of-flight of each return bit of the first plurality of bits based on one or more of a phase difference or propagation delay; determining, based on the estimated time-of-flight, that the second device is within the threshold distance of the first device; comparing each return bit of the first plurality of bits to a corresponding bit of the first authentication sequence; determining, based on comparing each return bit of the first plurality of bits to the corresponding bit of the first authentication sequence, whether each return bit of the first plurality of bits matches the corresponding bit of the first authentication sequence; and based on determining that each return bit of the first plurality of bits matches the corresponding bit of the first authentication sequence and the second device is within the threshold distance of the first device, generate an indication of a successful authentication.

Pairing the first device with the second device may comprise: generating a first private key and a first public key; storing, at the first device, the first public key; and storing, at the second device, the first private key.

The method may further comprise transmitting a presence signal with the identification of the first device.

Comparing the return bit of the first plurality of bits to the corresponding bit of the first authentication sequence may comprise: calculating an XOR value between the return bit of the first plurality of bits and a corresponding bit in the second plurality of bits; and comparing the XOR value with the corresponding bit received from the second device.

Determining the estimated time-of-flight may comprise at least one of: determining a number of cycles of the first plurality of bits on the first modulation frequency present between cycles of a baseband; determining a number of cycles of the second plurality of bits on the second modulation frequency present between cycles of the baseband; determining a number of features of an interference signal of the first plurality of bits on the first modulation frequency and the second plurality of bits on the second modulation frequency.

According to another aspect of the disclosure a non-transitory computer readable medium is provided. The medium has computer program code stored thereon. The computer program code, when executed by a processor, performs any of the described methods.

The details of one or more implementations are set forth in the accompanying drawings and the detailed description below. Other features and advantages will be apparent from the detailed description, the accompanying drawings, and the claims.

BRIEF DESCRIPTION OF THE DRAWINGS

FIG. 9 illustrates exemplary modules for device authentication.

DETAILED DESCRIPTION

Figure 1:
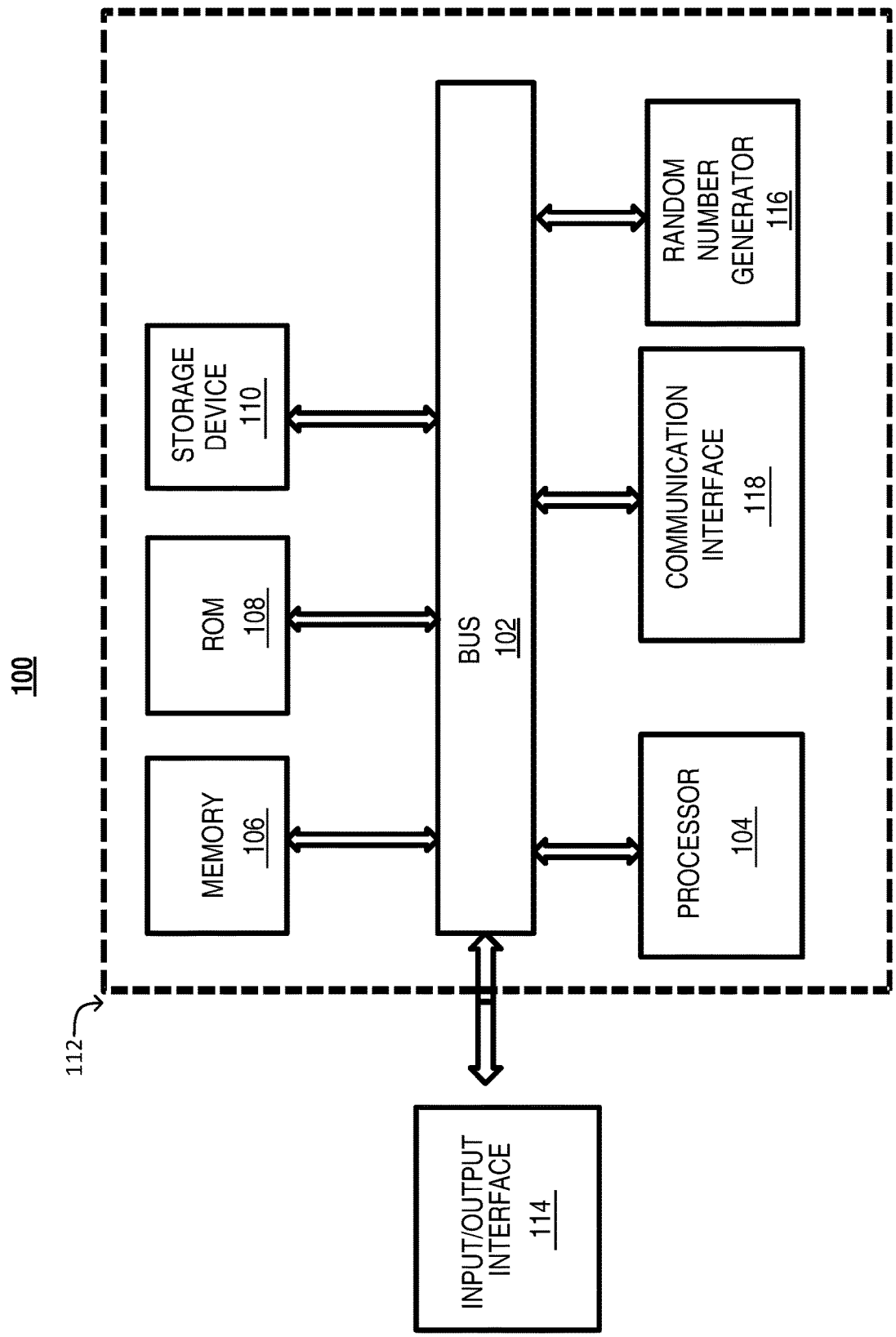
FIG. 1 illustrates a computer system 100 that may be used in authenticating two devices for access.

FIG. 1 illustrates a computer system that may be used in authenticating two devices. In some implementations, computer system 100 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices include desktop computer systems, portable computer systems, handheld devices, network devices or any other device that incorporates hard-wired and/or program logic to implement the techniques.

Computer system 100 may include a bus 102 or other communication mechanism for communicating information, and a hardware processor 104 coupled with a bus 102 for processing information. The hardware processor 104 can include, for example, a general-purpose microprocessor. Computer system 100 also includes memory 106, such as a random-access memory (RAM) or other dynamic storage device, coupled to the bus 102 for storing information and instructions to be executed by processor 104. In one implementation, the memory 106 is used for storing temporary variables or other intermediate information during execution of instructions to be executed by the processor 104. Such instructions, when stored in non-transitory storage accessible to processor 104, render the computer system 100 into a special-purpose machine that is customized to perform the operations specified in the instructions.

Computer system 100 further includes a read only memory (ROM) 108 or other static storage device coupled to the bus 102 for storing static information and instructions for the processor 104. A storage device 110, such as a magnetic disk, optical disk, solid-state drive, or three-dimensional cross point memory is provided and coupled to the bus 102 for storing information and instructions.

According to some implementations, the disclosed techniques are performed by computer system 100 in response to the processor 104 executing one or more sequences of one or more instructions contained in memory 106. Such instructions may be read into memory 106 from another storage medium, such as the storage device 110. Execution of the sequences of instructions contained in the main memory 106 causes the processor 104 to perform the process steps described herein. In some embodiments, hard-wired control circuitry is used in place of or in combination with software instructions.

In some implementations, computer system 100 also includes a communication interface 118 (e.g., with an associated transceiver) coupled to the bus 102. Communication interface 118 provides a two-way data communication (e.g., with other devices). In some implementations, communication interface 118 sends and receives electrical, electromagnetic, or optical signals that carry digital data streams representing various types of information. Communication interface 118 may support a variety of protocols. For example, the communications interface may support Bluetooth, WiFi, USB, and other suitable protocols for connecting an external electronic device to computer system 100.

In some implementations, computer system 100 includes an input/output interface 114. Interface 114 may be used by the computer system to communicate with external devices (e.g., peripherals including imaging devices, positioning devices, and other suitable devices. In some embodiments, one or more of components 102, 104, 106, 108, 110, 114, and 118 are combined to form control circuitry 112.

Figure 2:
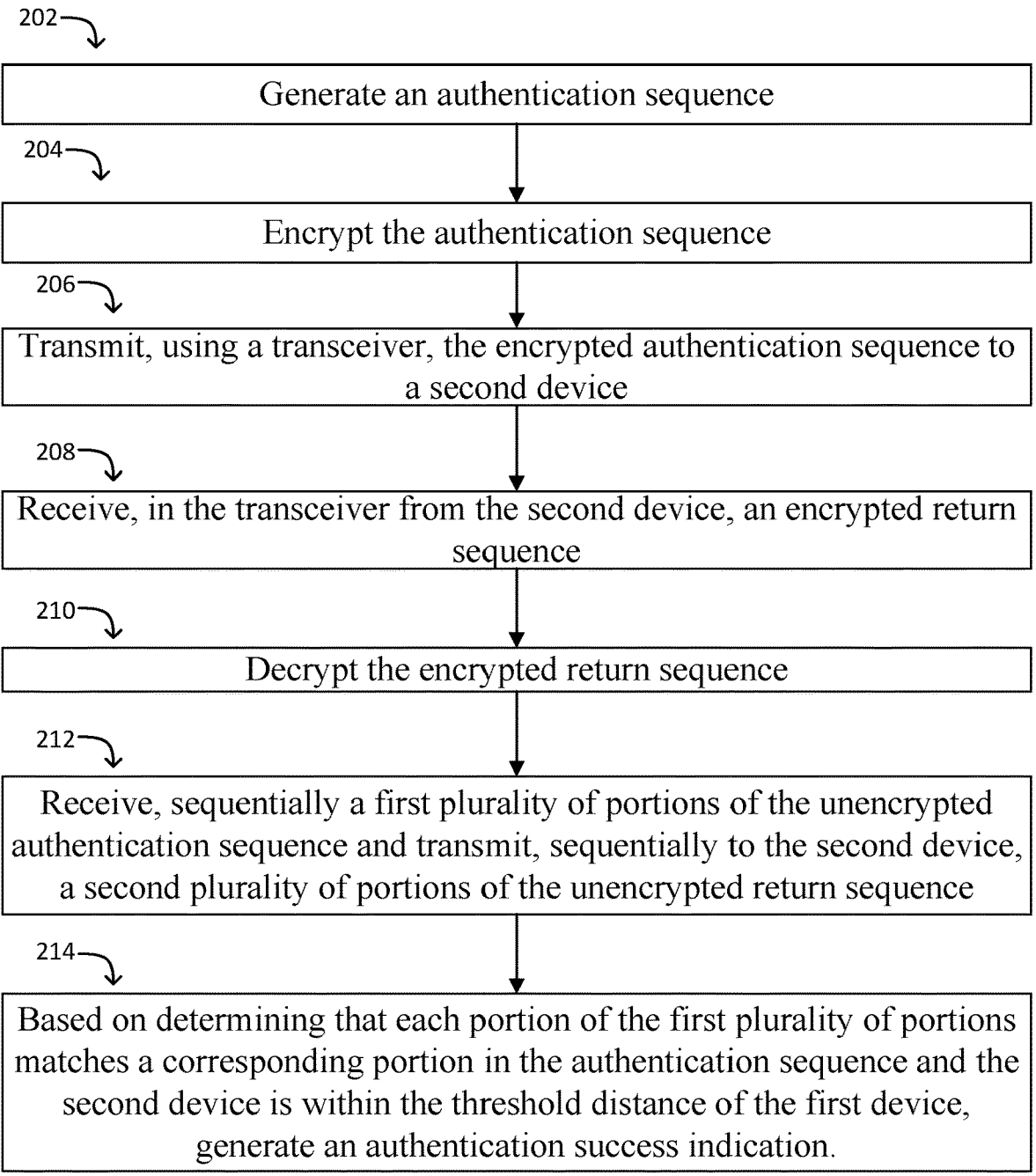
FIG. 2 is a block diagram that illustrates actions for authenticating two devices for access.

FIG. 2 is a block diagram that illustrates actions for authenticating two devices for access. In some implementations, the first device transmits a presence signal indicating that it is ready to start authentication. When a second device detects that presence signal, the second device signals to the first device (e.g., via a transmitted command) to start authentication. In some implementations the presence signal includes an identifier of the first device that the second device detects and determines whether to start the authentication process (e.g., whether the second device was paired with the first device). The authentication process may begin when the second device sends an indication to the first device to start authentication. At 202, control circuitry (e.g., control circuitry 112) generates, (e.g., on a first device) an authentication sequence. For example, processor 104 may receive an instruction (e.g., stored in memory 106 and/or ROM 108) to generate an authentication sequence. The processor uses a random number generator 116 to generate a random sequence of numbers and use the randomly generated numbers to generate the authentication sequence.

At 204, the control circuitry (e.g., control circuitry 112) encrypts the authentication sequence. Various methods may be used for encrypting the authentication sequence including, but not limited to PKI, e.g., identity-based encryption, certificateless public key cryptography, certificate-based encryption, and other suitable methods. Algorithms may include TriplesDES, RSA AES, AES-128, and other suitable algorithms. To encrypt the authentication sequence the processor may retrieve the authentication sequence from memory (e.g. memory 106) and execute an encryption algorithm providing the authentication sequence to the encryption algorithm. The encryption algorithm may output the encrypted authentication sequence.

At 206, the control circuitry (e.g., control circuitry 112) transmits, using a transceiver, the encrypted authentication sequence to a second device. In some implementations, the control circuitry uses the communication interface 118 to instruct a transceiver to transmit the authentication sequence to the second device. The second device receives the authentication sequence and decrypts it. The second device may have been paired with the first device and may include a key to decrypt the received authentication sequence. The second device may store the decrypted authentication sequence for future use.

At 208, the control circuitry (e.g., control circuitry 112) receives, in the transceiver from the second device, an encrypted return sequence. In some implementations, the second device has generated a return sequence and encrypted the return sequence (e.g., using a public key of the first device). The control circuitry receives the encrypted sequence using the communication interface 118 from the transceiver. At 210, the control circuitry decrypts the encrypted return sequence. The control circuitry may use a previously shared key (e.g., its own private key) to decrypt the return sequence and store the decrypted return sequence in memory 106 and/or storage device 110.

At 212, the control circuitry (e.g., control circuitry 112) receives, sequentially a first plurality of portions of the unencrypted authentication sequence and transmits, sequentially to the second device, a second plurality of portions of the unencrypted return sequence.

Figure 3:
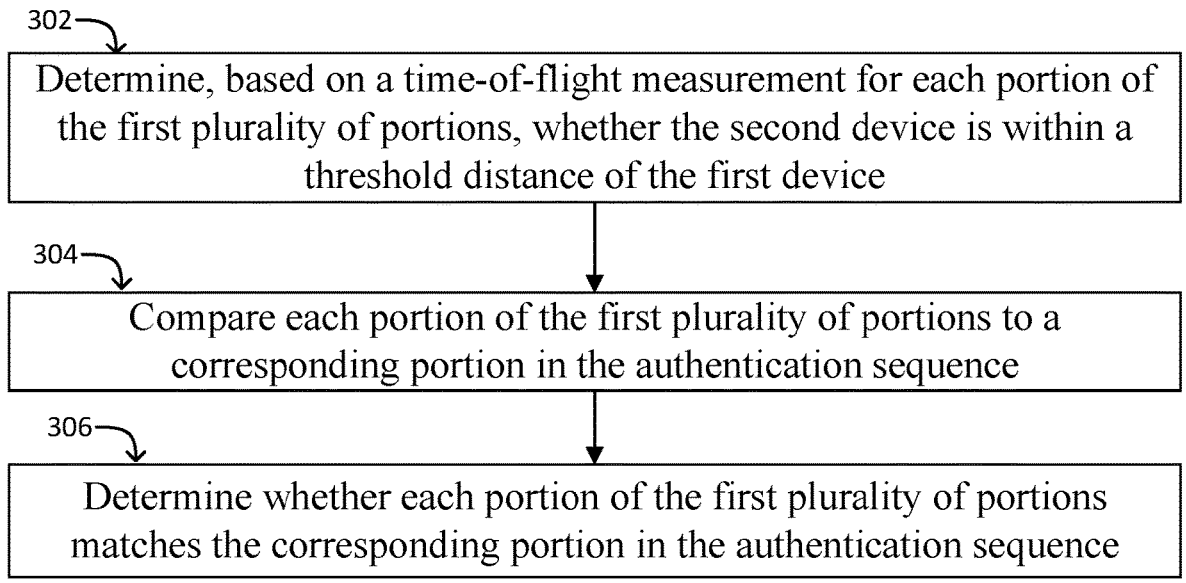
FIG. 3 illustrates actions taken during the receiving and the transmitting operations.

Process 300 of FIG. 3 illustrates actions taken during the receiving and the transmitting operations. At 302, the control circuitry determines, based on a time-of-flight measurement between each portion of the transmitted unencrypted return sequence and the corresponding portion of the received unencrypted authentication sequence), whether the second device is within a threshold distance of the first device. As discussed above, the control circuitry may start with transmitting a first portion of unencrypted return sequence to the second device. The first portion may be a bit, a byte, a character, or another suitable data value. The control circuitry may use the communication interface to transmit the portion of the unencrypted return sequence (e.g., using a transceiver) to the second device and also store (e.g. in memory 106 and/or storage device 110) a time of transmission.

In some implementations, the second device includes its own transceiver and control circuitry for processing. The second device has some or all components as described in FIG. 1. The second device may receive the portion of the return sequence and in response, send back the first portion of the unencrypted authentication sequence. The portion may be a bit, a byte, a character or another suitable data value. In some implementations, the second device processes the received encrypted portion of the return sequence. The processing may include comparing the received first portion with the first portion of the originally-generated return sequence. In some implementations, if the comparison between the portions is successful the second device transmits, to the first device, the first portion of the unencrypted authentication sequence. However, if the comparison is unsuccessful, the second device may indicate that authentication has failed.

When the control circuitry receives (e.g., from the transceiver through communications interface 118) the first portion of the unencrypted authentication sequence, the control circuitry calculates a time-of-flight of the first portion based on propagation delay or phase difference between the transmitted and received signals. Based on the time-of-flight, the control circuitry determines, the distance between the first device and the second device.

At 304, the control circuitry (e.g., control circuitry 112) compares each portion of the first plurality of portions to a corresponding portion in the authentication sequence. That is, the control circuitry compares, (as each portion is received) each received portion with a corresponding portion of the originally-generated authentication sequence. The comparison may include comparing bits, bytes, characters or other suitable portions. At 306, the control circuitry (e.g., control circuitry 112) determines whether each portion of the first plurality of portions matches the corresponding portion in the authentication sequence. That is, the control circuitry determines whether the received portion of the unencrypted authentication sequence matches the corresponding portion of the originally-generated authentication sequence. This process is repeated for every portion received.

To continue with FIG. 2, when each portion has been processed, at 214, the control circuitry (e.g., control circuitry 112) based on determining that each portion of the first plurality of portions matches a corresponding portion in the authentication sequence and the second device is within the threshold distance of the first device, generates an authentication success indication. If while receiving each portion, the control circuitry determines that each portion of the unencrypted authentication sequence matches the received portion of the unencrypted authentication sequence and based on time-of-flight measurements the device is within the threshold distance, the control circuitry generates a success indication.

Figure 4:
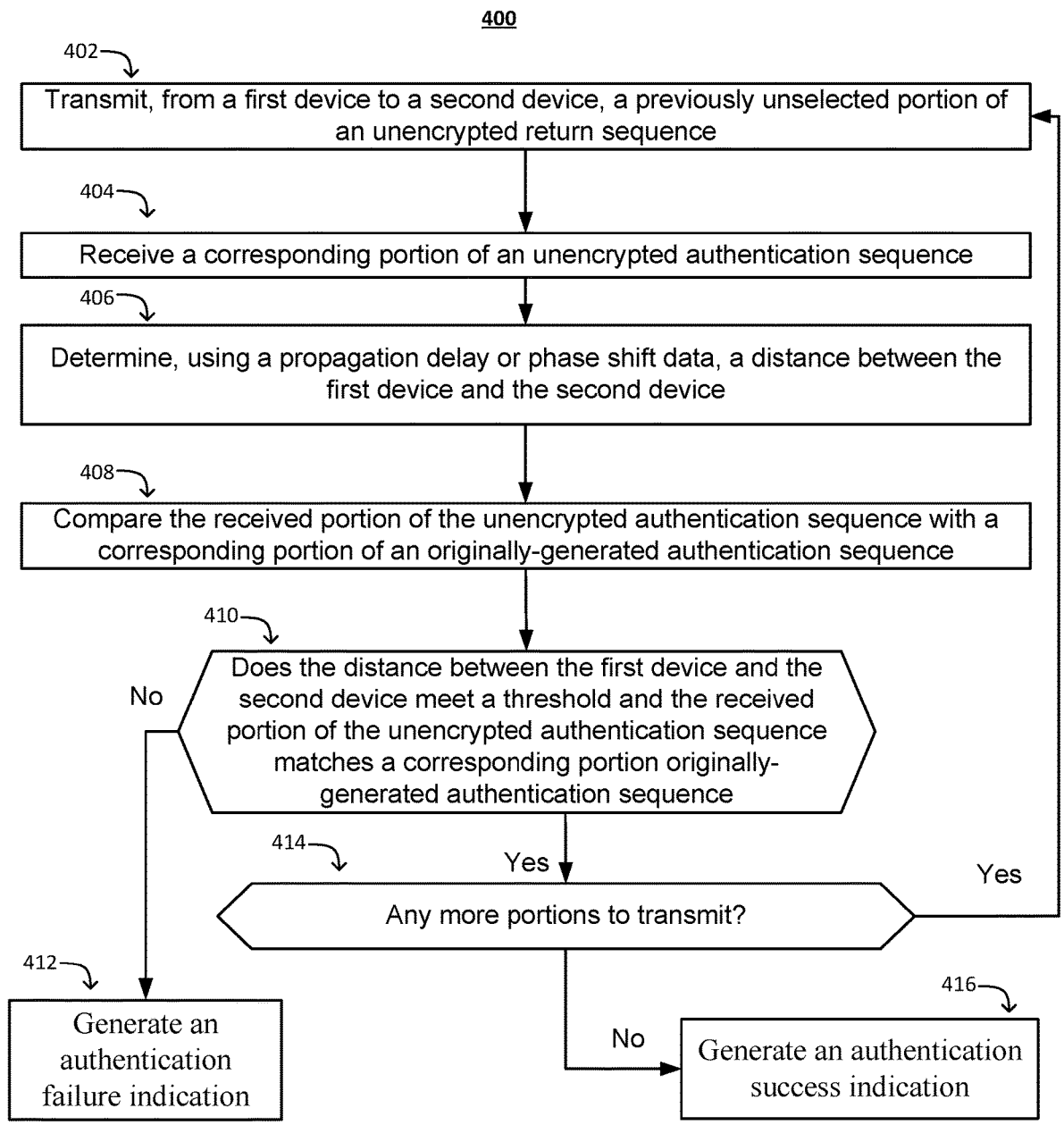
FIG. 4 illustrates detailed actions taken during the receiving and the transmitting operations.

FIG. 4 illustrates detailed actions taken by the first device during the receiving and the transmitting operations. These actions may be used independently from the encryption/decryption actions described in this disclosure. At 402, the control circuitry (e.g., control circuitry 112) transmits, from a first device to a second device, a previously unselected portion of an unencrypted return sequence. The transmission sequence starts with the first portion (e.g., bit, byte, character, or another suitable portion). For example the control circuitry may retrieve (e.g., from memory 106) the first portion of the unencrypted return sequence and transmit that portion to the second device.

At 404, the control circuitry receives a corresponding portion of an unencrypted authentication sequence. The control circuitry may store (e.g. in memory 104 and/or storage device 110) the received portion. At 406, the control circuitry determines, based on a time-of-flight measurement using propagation delay or phase shift data, a distance between the first device and the second device.

At 408, the control circuitry compares the received portion of the unencrypted authentication sequence with a corresponding portion of an originally-generated authentication sequence. The control circuitry may make this determination by comparing the received portion and the originally-generated portion.

At 410, the control circuitry determines whether the distance between the first device and the second device meet a threshold and the received portion of the unencrypted authentication sequence matches a corresponding portion originally-generated authentication sequence. If the calculated distance is equal to or less than the threshold distance or in some implementations less than the threshold distance, the control circuitry determines that the second device within a threshold distance of the first device. If the control circuitry determines that the distance between the first device and the second device meets a threshold and the received portion of the unencrypted authentication sequence matches a corresponding portion originally-generated authentication sequence, process 400 moves to action 414. If the control circuitry determines that the distance between the first device and the second device does not meet a threshold or the received portion of the unencrypted authentication sequence matches a corresponding portion originally-generated authentication sequence, process 400 moves to action 412. At 412, the control circuitry generates an authentication failure indication. That indication can include one or more of, stopping the authentication process, transmitting a message to the second device, and other suitable indication.

At 414, the control circuitry determines whether there are any more portions to transmit to the second device. If there are no more portions to transmit process 400 moves to action 416, where the control circuitry generates an authentication success indication. For example, the control circuitry can cause a vehicle to open one or more doors if the system is built into a vehicle. If there are more portions to transmit, process 400 moves to action 402 where the next portion is transmitted to the second device.

In some implementations, the control circuitry uses signing certificates in the authentication system. In these implementations, the first device stores a verification certificate on the first device and a signing certificate on the second device. The first device transmits data (e.g., an authentication sequence) to the second device. The second device receives the data (e.g., the authentication sequence) and uses a signing certificate to create a signature. The second device transmits the signature to the first device. The first device receives the signature and verifies it. If verification is successful, the first device proceeds with the authentication.

In some implementations, the control circuitry generates an authentication failure indication based on determining that the second device is not within the threshold distance of the first device. For example, the control circuitry can use an input/output interface 114 to communicate the failure. In some implementations, the control circuitry may use a communications interface 118 to transmit the failure indication to the second device. The control circuitry may also communicate a success indication to the second device. If there is a successful authentication, the control circuitry may receive (e.g., via communications interface 118) commands to be execute by the host-system. For example, if the system control access to a house, if the authentication is successful, the control circuitry may open the door closest to the second device and enable the user of the second device to, for example, open other doors, start a heating system, an air conditioning system or another suitable system. If the system is part of a vehicle, upon authentication, the control circuitry may accept commands to open one or more vehicle's doors, open the trunk of the vehicle, start the vehicle, or accept another suitable command. In addition, the control circuitry generates an authentication failure indication based on determining that one or more portions of the received unencrypted authentication sequence do not match the corresponding originally-generated portions.

In some implementations, the control circuitry determines a distance between the first device and the second device by storing a time associated with transmission of a previous portion of the second plurality of portions (i.e., transmission of a portion of an unencrypted return sequence. The control circuitry further receiving a portion of the first plurality of portions (i.e., a portion of the unencrypted authentication sequence), and compares the time associated with the transmission of the previous portion of the second plurality of portions (i.e., previous portion of the unencrypted return sequence) to a time when the portion of the plurality of portions (i.e., the corresponding portion of the unencrypted authentication sequence) was received. The control circuitry determines, based on a difference between the time associated with the transmission of the previous portion of the second plurality of portions and the time when the portion of the first plurality of portions was received, a distance between the first device and the second device, and determines, based on the distance, whether the second device is within the threshold distance of the first device.

In some implementations the authentication sequence may be a first bit string (e.g., string of zeros and ones) and the return sequence may be a second bit string (e.g., string of zeros and ones). In this implementations, the exchange may be a bit-by-bit exchange.

Figure 5:
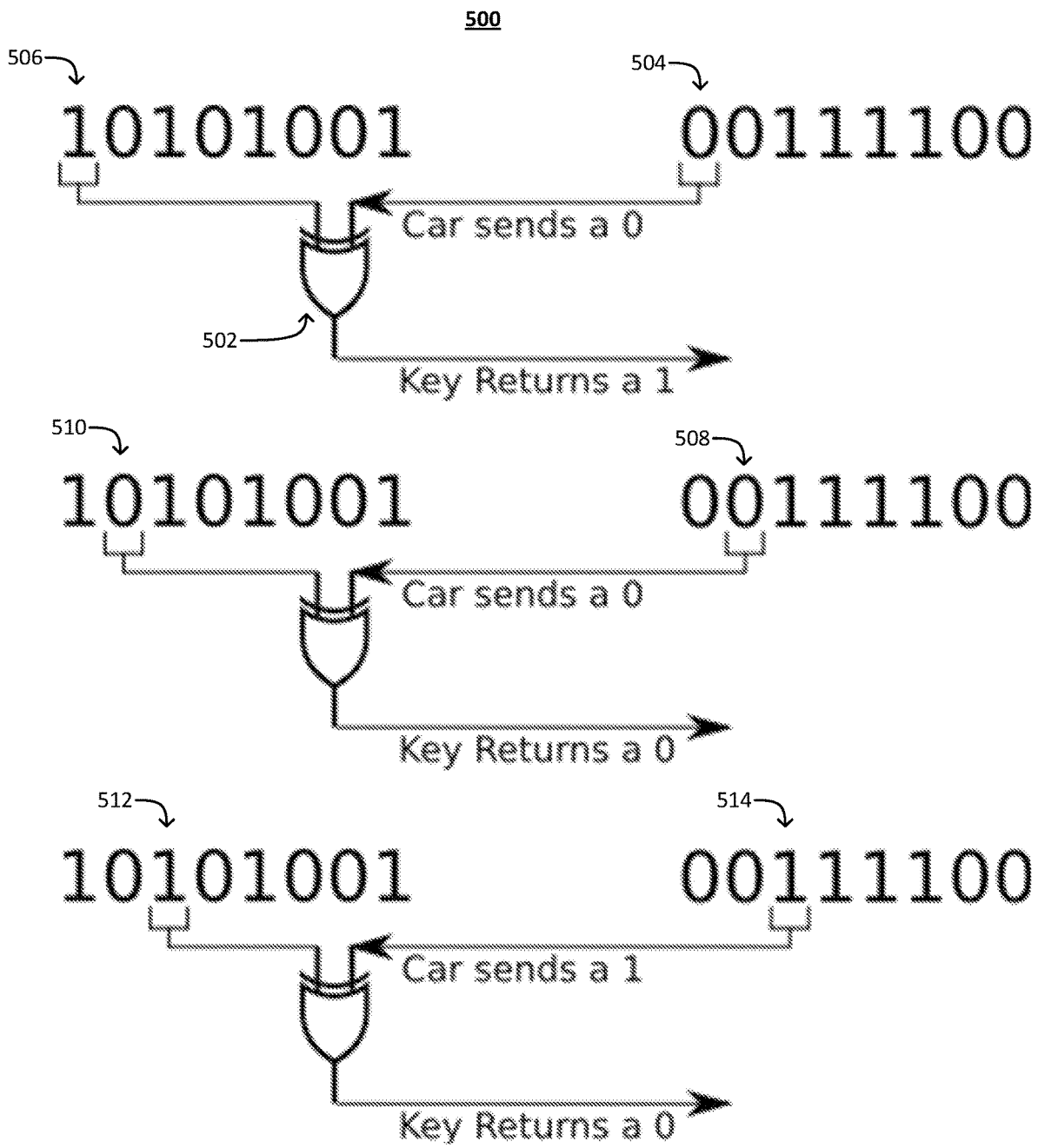
FIG. 5 illustrates a bit-wise exchange for a vehicle and an electronic key using an XOR gate.

FIG. 5 illustrates one way of performing a bit-wise exchange for a car and an electronic key using an XOR gate. The car sends bit 504 (with a value of zero) to the electronic key. The electronic key selects bit 506 (with a value of one) to return to the car. The electronic key may use XOR gate 502 with the values of bits 504 and 506 to calculate a value of one to return to the car. The car when receiving the value may XOR that value with its stored authentication sequence or return sequence. If the car sends bit 508 (with a value of zero) and the key's next bit is bit 510 with a value of zero, the XOR operation yields a zero that is sent to the car. If both bits are equal to one (e.g., as demonstrated by bits 512 and 514), the key returns a value of zero to the car. Because the XOR gate is very fast, the time added for processing is negligible and the system is able to perform efficiently.

Figure 6:
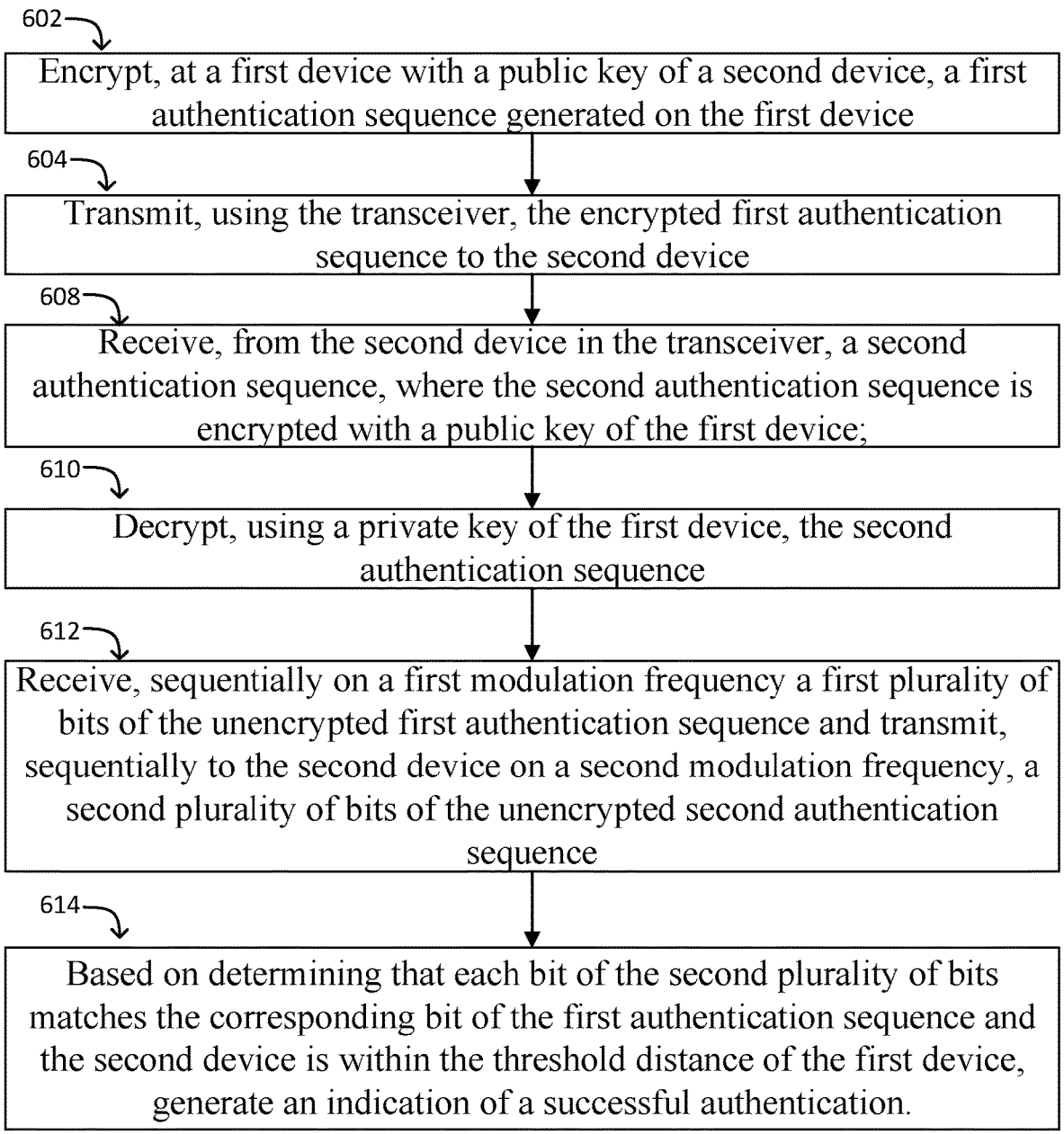
FIG. 6 is another block diagram that illustrates actions for authenticating two devices for access.

FIG. 6 is another block diagram that illustrates actions for authenticating two devices for access. As discussed in relation to FIG. 2, the first device may be transmitting a presence signal indicating that it is ready to start authentication. When a second device detects that presence signal, the second device may signal to the first device to start authentication. In some implementations the presence signal includes an identifier of the first device. The second device may detect the identifier and determine whether to start the authentication process (e.g., whether the second device was paired with the first device). The authentication process may begin when the second device sends an indication to the first device to start authentication. At 602, control circuitry (e.g., control circuitry 112) encrypts, at a first device with a public key of a second device, a first authentication sequence generated on the first device. Although, the actions of FIG. 6 refer to encryption with public keys and decryption with private keys, a different encryption/decryption method may be used. For example, the control circuitry may use a single encryption key (e.g., shared at the time of pairing the first and second devices) to encrypt/decrypt authentication sequences.

In some implementations, the first authentication sequence may be a sequence of bits (e.g., a binary number). In some implementations, an authentication sequence is a digital sequence which represents any form of a binary string.

At 604, the control circuitry transmits, using the transceiver, the encrypted first authentication sequence to the second device. For example the control circuitry may use communication interface 118 for transmission. At 608, the control circuitry receives, from the second device in the transceiver of the first device, a second authentication sequence, where the second authentication sequence is encrypted with a public key of the first device. For example, the control circuitry may receive the second authentication sequence from communication interface 118.

At 610, the control circuitry decrypts, using a private key of the first device, the second authentication sequence. For example, the control circuitry may execute a decryption function on the received second authentication sequence using the private key of the first device. At 612, the control circuitry receives, sequentially on a first modulation frequency a first plurality of bits of the unencrypted first authentication sequence and transmits, sequentially to the second device on a second modulation frequency, a second plurality of bits of the unencrypted second authentication sequence. That is, the control circuitry executes a bit-wise transfer sequence.

Figure 7:
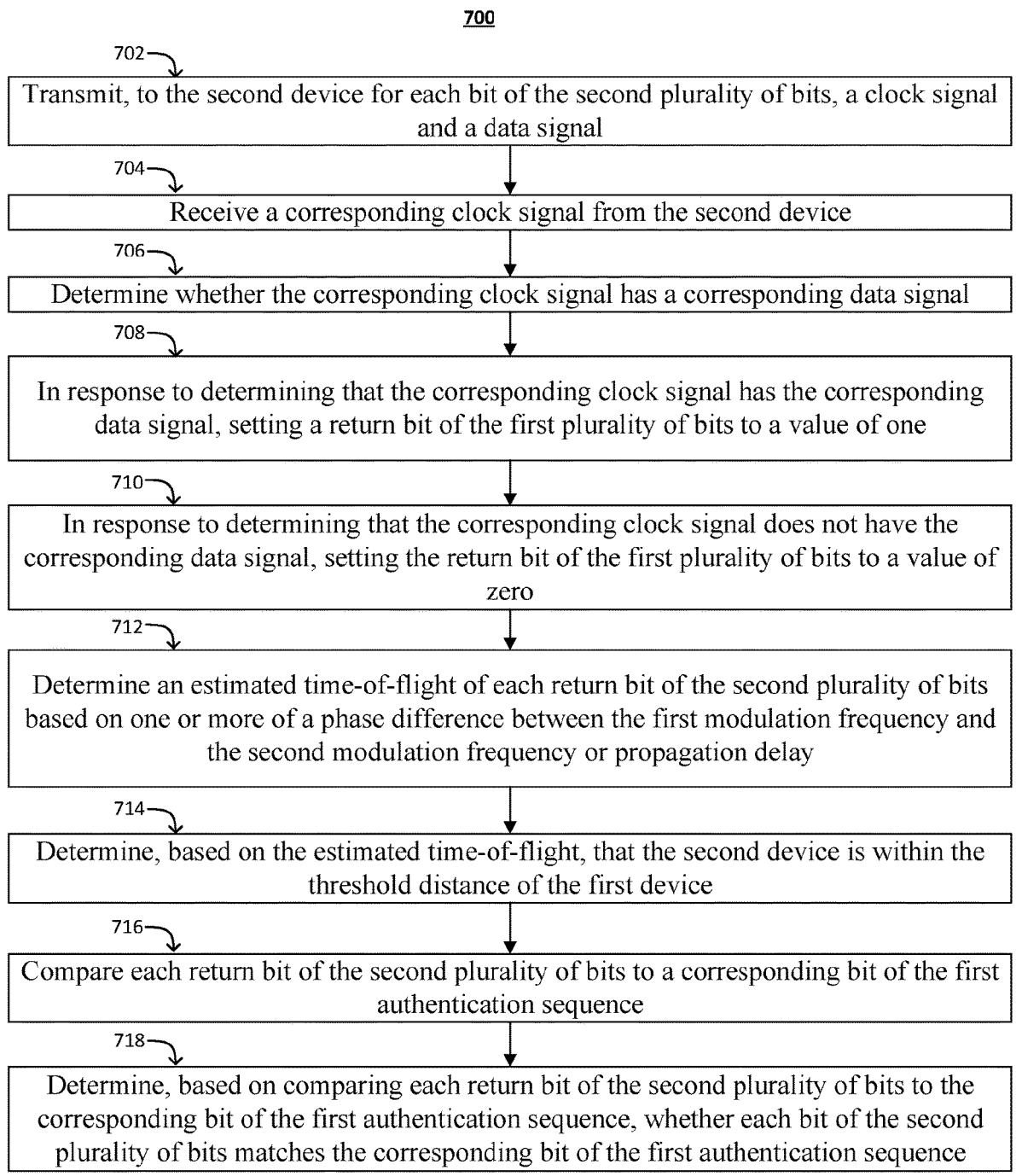
FIG. 7 illustrates actions taken during the receiving and the transmitting operations.
Figure 8:
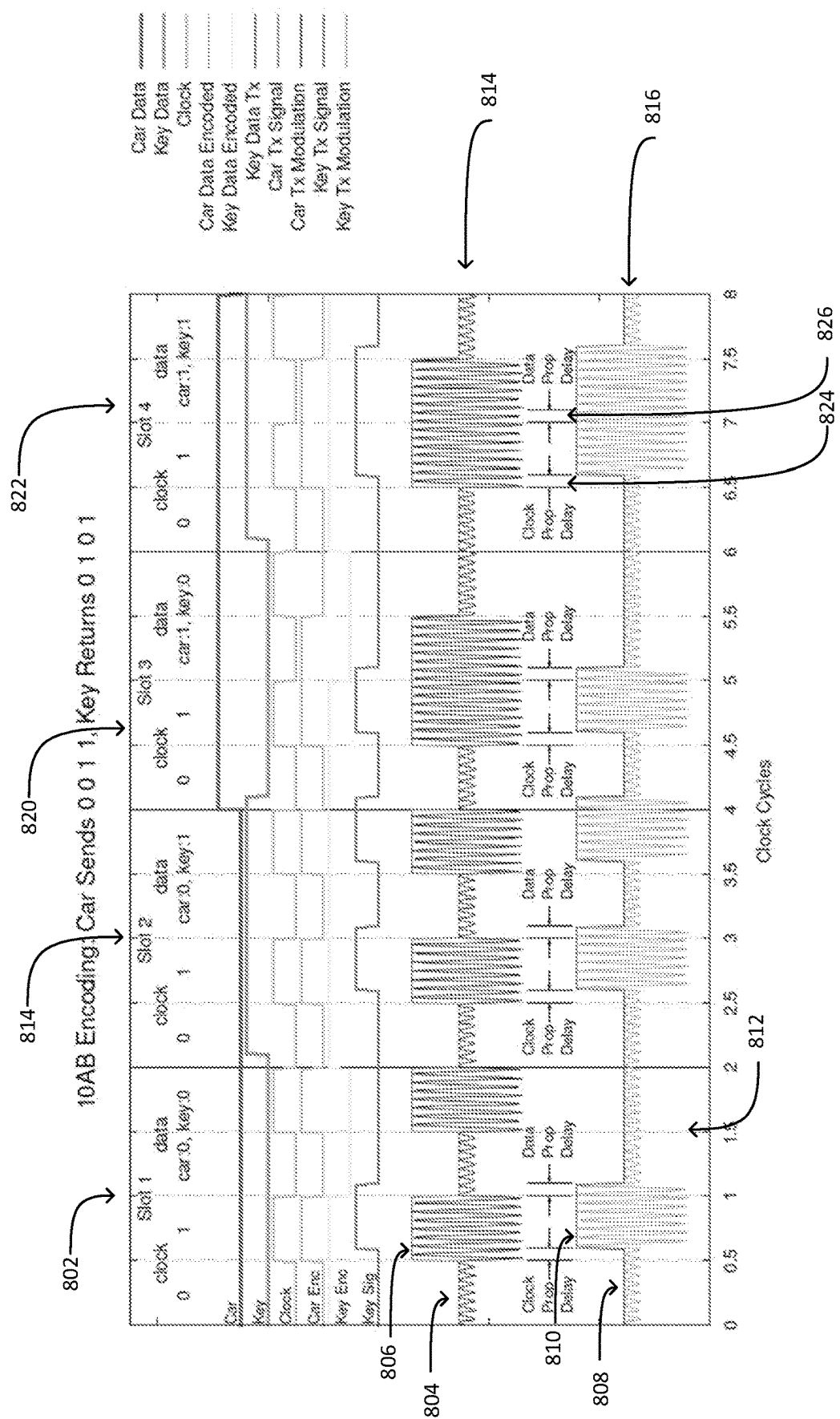
FIG. 8 illustrates different transmission options for a bit-wise transmitting and receiving operations.

FIG. 7 illustrates one way to perform the bit-wise transfer operation. At 702, the control circuitry transmits, to the second device for each bit of the second plurality of bits, a clock signal and a data signal. For example, in slot 1 (slot 802) as illustrated in FIG. 8 the control circuitry causes the transmission of a clock illustrated by a low amplitude transmission 804 followed by a high amplitude transmission followed by a high amplitude transmission 806. During the second clock cycle, the control circuitry causes a transmission of a bit of data. The combination of a low amplitude transmission followed by a high amplitude transmission indicates to the electronic key that a bit with a value zero was sent.

At 704, the control circuitry receives a corresponding clock signal from the second device. FIG. 8 illustrates (in slot 1) a response clock signal that includes a low amplitude transmission 808 followed by a high amplitude transmission 810. FIG. 8 illustrates that the response is offset by a clock propagation delay. As discussed above, the control circuitry may use propagation delay to calculate the distance between the two devices.

At 706, the control circuitry determines whether the corresponding clock signal has a corresponding data signal. At 708, the control circuitry, in response to determining that the corresponding clock signal has the corresponding data signal, sets a return bit of to a value of one. At 710, the control circuitry, in response to determining that the corresponding clock signal does not the corresponding data signal, sets a return bit of the first plurality of bits to a value of zero. In some embodiments, the signal may be a low amplitude signal.

FIG. 8 illustrates that in slot 1 the return signal from the second device is absent or has a low amplitude therefore, the bit being transmitted by the second device is zero. As further shown in FIG. 8, amplitude graph line 814 represents transmissions by the car and amplitude graph line 816 represents transmission by the electronic key. In slot 2 (slot 814), FIG. 8 illustrates (based on amplitude changes) that the car sends the clock signal again follow by a zero (low amplitude to high amplitude in the second cycle of slot 2). The electronic key responds with a clock signal (offset by the propagation delay) and the identical signal that was sent by the car, indicating that the next bit from the electronic key is a one. That is, the electronic key sends a copy of the signal back to the car. In slot 3 (slot 820), the car sends a clock signal (low to high amplitude change) followed by a bit with a value of one (based on the amplitude change from high to low in the second cycle of slot 3). The electronic key responds with (i.e., the car receives) a zero as low amplitude signal is shown (or no signal at all). Slot 4 (slot 822) illustrates a car sending a clock signal in the first clock cycle of slot 4 followed by a one bit (based on high amplitude to low amplitude half clock signals). The electronic key responds (i.e., the car receives) an identical signal back (clock followed by data signal). Indicating that a one bit is sent.

Therefore, FIG. 8 illustrates that when the electronic key sends a signal that is identical to the one the car sent in the previous transmission (irrespective whether the signal is low amplitude followed by high amplitude or vice versa), the signal indicates that the bit is a one bit. If the electronic key sends a low amplitude signal or no signal, that signal indicates that the electronic key has sent a zero bit. To follow the sequence of FIG. 8, the car sends 0011 and the key returns 0101, in order.

At 712, the control circuitry determines an estimated time-of-flight of each return bit of the second plurality of bits based on one or more of a phase difference or propagation delay. FIG. 8 illustrates propagation delay for the clock (i.e., propagation delay 824) and propagation delay for the data (i.e., propagation delay 826). The control circuitry may use each propagation delay as the time-of-flight measurement. In some embodiments, the control circuitry uses a combination of clock and data propagation delays for each corresponding slot. In some embodiments, the control circuitry uses phase difference between the basebands demodulated from signals at the first and second modulation frequencies to determine time-of-flight.

Generally, time-of-flight may be determined by comparing a reflected signal (e.g., light) to an incident signal to determine how long the signal required to go from a source (e.g., an illuminator) to a target (e.g., a sensor). In some embodiments, a radio frequency signal is used by the first and the second devices to communicate. However, because radio frequency signal is different from light signal (e.g., the reflected signal and the incident signal may interfere with each other). The return signal is transmitted by the second device and received by the first device on a different (e.g., higher frequency) carrier.

Various modulation options may be used with the embodiments described in this disclosure. The system may use Amplitude Shift Keying ("ASK"), Binary Phase Shift Keying ("BPSK"), QAM, Sync Bit, and other suitable modulation techniques. In some embodiments, combinations of these techniques may be used (e.g., amplitude modulation carrying an ASK digital modulation with a sync bit slot).

At 714, the control circuitry determines, based on the estimated time-of-flight, that the second device is within the threshold distance of the first device. For example, the control circuitry may multiply the time-of-flight value by the speed of light and divide the result by two to determine the distance between the first device and the second device. At 716, the control circuitry compares each return bit of the second plurality of bits to a corresponding bit of the first authentication sequence. For example, the control circuitry sequentially compares the received bits of the first authentication sequence with the corresponding originally-generated bits of the first authentication sequence. In some embodiments, the electronic key also performs the comparison of the received bits (e.g., of the second authentication sequence).

At 718, the control circuitry determines, based on comparing each return bit of the second plurality of bits to the corresponding bit of the first authentication sequence, whether each bit of the second plurality of bits matches the corresponding bit of the first authentication sequence. In some embodiments, at each stage of process 700, process 700 returns the results of the comparison and the distance between the first and second device to process 600 of FIG. 6. Process 600 analyzes the results and either instructs process 600 to continue (i.e., if the second device is within the threshold distance of the first device and the corresponding bits match at the specific stage) or aborts both process 700 if the distance is not within the threshold or the bits do not match.

At 614 of FIG. 6, the control circuitry, based on determining that each bit of the second plurality of bits matches the corresponding bit of the first authentication sequence and the second device is within the threshold distance of the first device, generates an indication of a successful authentication.

In some implementations, the control circuitry pairs the first device and the second device. To pair the first device and the second device, the control circuitry generates, for the first device, a first private key and a first public key, and generates, for the second device, a second private key and a second public key. The control circuitry stores, at the first device, the first private key and the second public key; and stores, at the second device, the second private key and the first public key. In some implementations, the control circuitry generates a single key for both the first device and the second device and stores that key on both devices. The control circuitry then uses that single key to both encrypt and decrypt various authentication sequences. A person skilled in the art would understand that the control circuitry can use various encryption/decryption schemes that can be setup during the paring process.

In some implementations, the control circuitry transmits a presence signal with the identification of the first device. As discussed above, the identification is used by the second device to determine whether the second device has been paired to the first device (i.e., based on the identification). If the second device determines that it has been paired with the first device, the second device begins the authentication process. The identification can be a hexadecimal string, a binary string, an alphanumeric string, or another suitable identification.

In some implementations, an XOR operation is used to perform one-way authentication using one public/private key pair. In a relay attack, the relay is unable to predict the data being sent in either direction. In these and other implementations, the control circuitry uses an XOR gate in the comparison operation. Specifically, the control circuitry calculates an XOR value between the bit of the second plurality of bits and a corresponding bit in the first plurality of bits. That is, the control circuitry determines an XOR value between bits of the two strings. The control circuitry then compares the XOR value with the corresponding bit received from the second device. In these implementations, the second device does the same XOR operation so that the bits match. In some implementations, the control circuitry receives a bit and performs an XOR operation between the received bit and a corresponding bit in the first authentication sequence. The control circuitry then compares the result with a corresponding bit in the second authentication sequence. In these implementations, the second device performs a similar operation.

FIG. 9 is illustrates exemplary modules for device authentication. Module 900 illustrates an example of a module built into a first device (e.g., built into a vehicle) and module 950 illustrates an example of a module built into a second device (e.g., built into an electronic key). Module 900 includes a demodulator 902 that receives modulated signal and demodulates that signal. Digitizer 904 receives the signal from demodulator 902 and digitizes that signal. Propagation delay comparator 906 receives the signal and determines propagation delay (i.e., time-of-flight). In some implementations, phase comparator 924 is used to determine time-of-flight (e.g., based on phase shift of the return signal). Processor module 908 receives the propagation delay results and the digitized signal. The processor module 908 is an example of control circuitry discussed in this application. The processor module 908 uses the timing verification module 910 to determine (e.g., based on output from the propagation delay comparator 906) whether the second device is within a threshold distance of the first device. Crypto module 912 decrypts data in the received signals. Processor module 908 uses the remote public key 914 to encrypt data that is transmitted to the second device (e.g., encrypts the authentication string before transmitting it to the second device). The processor module uses the random number generator to generate authentication sequences. Clock divider 918 generates a clock signal and digital amplitude shift keying ("ASK") modulator 920 transform digital data (e.g., bits) into variations in the amplitude of a carrier wave. Analog modulator 922 transfers an analog baseband (low frequency) signal over a higher frequency signal such as a radio frequency band.

In some implementations, module 900 includes a Phase Locked Loop 930 for accurate clock recovery. The Phase Locked Loop aids in communicating a precise clock between two devices (e.g., the first device and the second device). Specifically, the Phase Locked Loop 930 synchronizes the clock domains. The digital clock transitions at regular, specific points in the phase of both the low- and high-frequency carriers. The Phase Locked Loop 930 enables precise timing information within the bit exchanges. This technique improves the accuracy of phase detection, which improves the measurement of propagation delay, and therefore the time-of-flight distance.

In some implementations, three different modulation frequencies are required in this system. Two different high-frequency modulation carriers (HF1 and HF2) which both carry the same common low-frequency modulation (LF1). Module 900 transmits on HF1 and Module 950 receives and demodulates it, extracting LF1, via a low latency bandpass filter 952. Module 950 modulates LF1 on the HF2 carrier frequency at analog modulator 970 and transmits the modulated signal to module 900, which demodulates the signal, extracting LF1, using demodulator 902. Because module 950 processes signals extremely quickly, the process can be susceptible to noise. A low latency bandpass filter (e.g., low latency bandpass filter 952) mitigates the effects of noise without increasing the propagation delay of the reflected signal. Digitizer 956 receives the LF1 signal from low latency bandpass filter 952 and digitizes that signal. The analog buffer 954 also receives LF1 from low latency bandpass filter. It allows specific portions of LF1 to be suppressed based on whether a zero bit or a one bit needs to be transmitted from Module 950 to Module 900.

In some implementations, the first device utilizes Phase Locked Loop 930 to synchronize the clock signal with a specific phase of both carrier frequencies LF and HF1. A clock divider is used to base both carriers on a common clock. The second device when receiving the signal uses the low-latency bandpass filters that utilize all three clock domains to recover the digital signal with a minimum of propagation delay.

Module 950 also includes a processor module 958. In some implementations, module 950 is control circuitry built into the second device with modules that can include memory (e.g., for storing keys for encryption and decryption). The processor module 958 includes a local secret key 960 for decrypting received data and a remote public key 962 for encrypting data that is transmitted to the first device. In some implementations, the local secret key 960 and the remote public key 962 are generated during the pairing process. Demodulator 966 demodulates the signal coming into module 950. The shift register 964 contains the decrypted authentication sequence which was transmitted from module 900. It encodes this decrypted sequence into LF1 by driving the enable/disable line to the analog buffer, suppressing specific portions of LF1 with high-accuracy and low-latency. In some implementations, module 950 includes an XOR gate 968 that performs XOR operations on bits. An analog modulator 970 modulates LF1 on the HF2 carrier frequency, generated within module 950.

Figure 10:
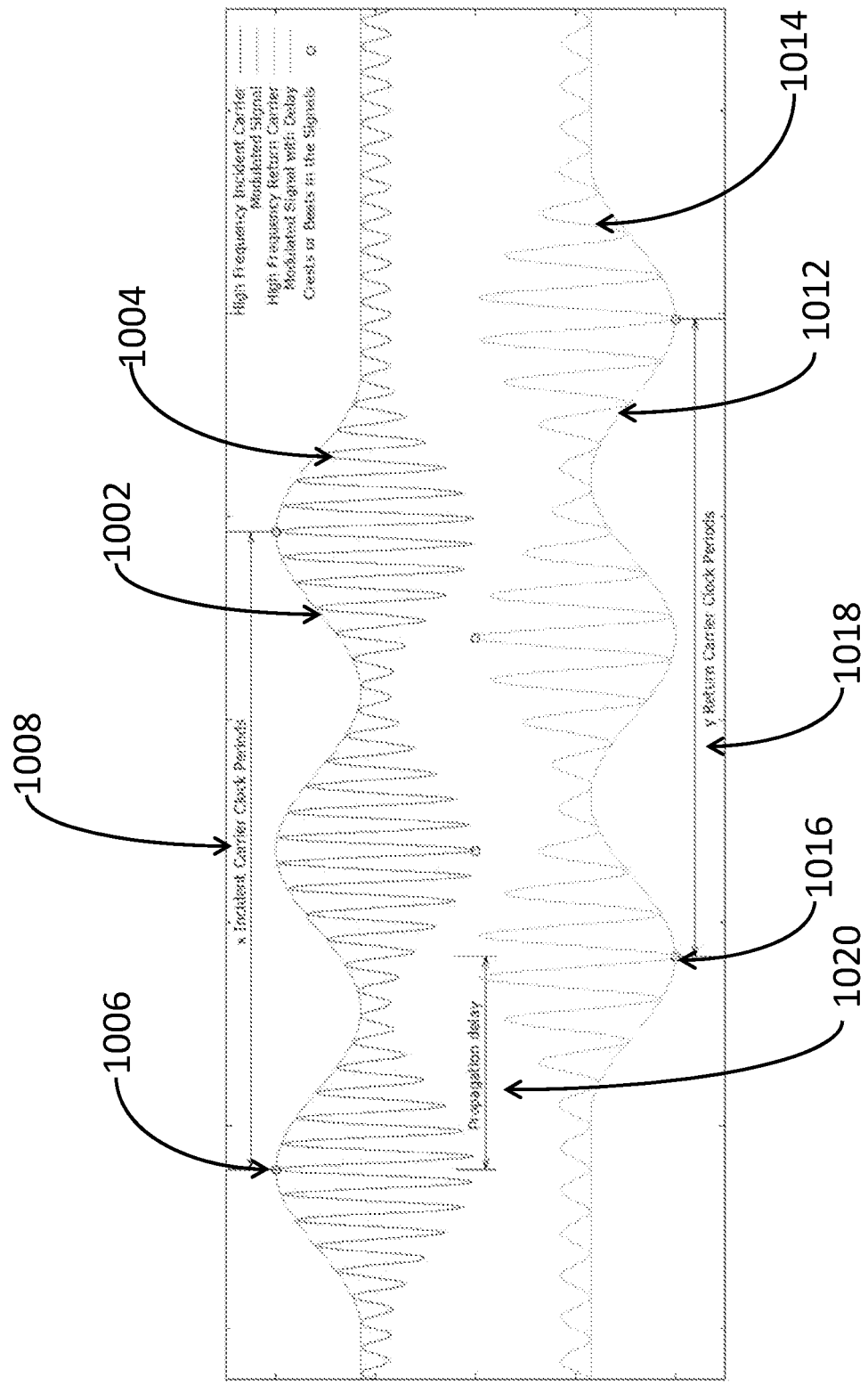
FIG. 10 illustrates exemplary first and second modulation frequency waveforms.

The first and second modulation frequencies may be integer multiples of a baseband. For example, if the baseband is 1 MHz, the first modulation frequency may be selected to be 928 MHz. FIG. 10 illustrates exemplary first and second modulation frequency waveforms.

The first plurality of bits of the unencrypted first authentication sequence are received on the first modulation frequency as first signal 1002. The first signal 1002 comprises an incident carrier 1004 which corresponds with the first modulation frequency. The first signal 1002 is accordingly the first plurality of bits (i.e. baseband) modulated on the incident carrier 1004. As illustrated in FIG. 10, the first signal 1002 has identifiable features, e.g. peaks, beats, crests, troughs, etc. In particular, the peaks 1006 of the first signal 1002 have been highlighted. The first signal 1002 may be received from the second device, e.g. key fob, by the first device, e.g. a vehicle.

The second plurality of bits of the unencrypted second authentication sequence are then transmitted, as previously described, on the second modulation frequency as second signal 1012. The second signal 1012 comprises a return carrier 1014 which corresponds with the second modulation frequency. The second signal 1012 is accordingly the second plurality of bits (i.e. baseband) modulated on the return carrier 1014. The second signal 1012 has identifiable features, e.g. peaks, beats, crests, troughs, etc. In particular, the peaks 1016 of the second signal 1012 have been highlighted.

The second signal 1012 may be transmitted from the first device, e.g. the vehicle, to the second device, e.g. key fob.

The first modulation is selected to be an integral factor of the baseband. Similarly, the second modulation frequency is selected to be an integral factor of the baseband. Determining an estimated time-of-flight comprises: determining a number of cycles of the first signal 1002 on the incident carrier 1004 present between cycles of the baseband, and/or determining a number of cycles of the second signal 1012 on the return carrier 1014 present between cycles of the baseband. This determination is achieved by counting the number of cycles.

The periods of the signals 1002, 1012 highlighted as 1008 and 1018, respectively, may facilitate this determination. Furthermore, the peaks 1006, 1016 of the signals 1002, 1012 may additionally or alternatively facilitate this determination. The propagation delay 1020 is illustrated between peaks 1006 and 1016.

Alternatively or in addition, determining the estimated time-of-flight comprises: counting the peaks due to constructive interference between the signals 1002, 1012 in both the transmitting and receiving directions.

Figure 11:
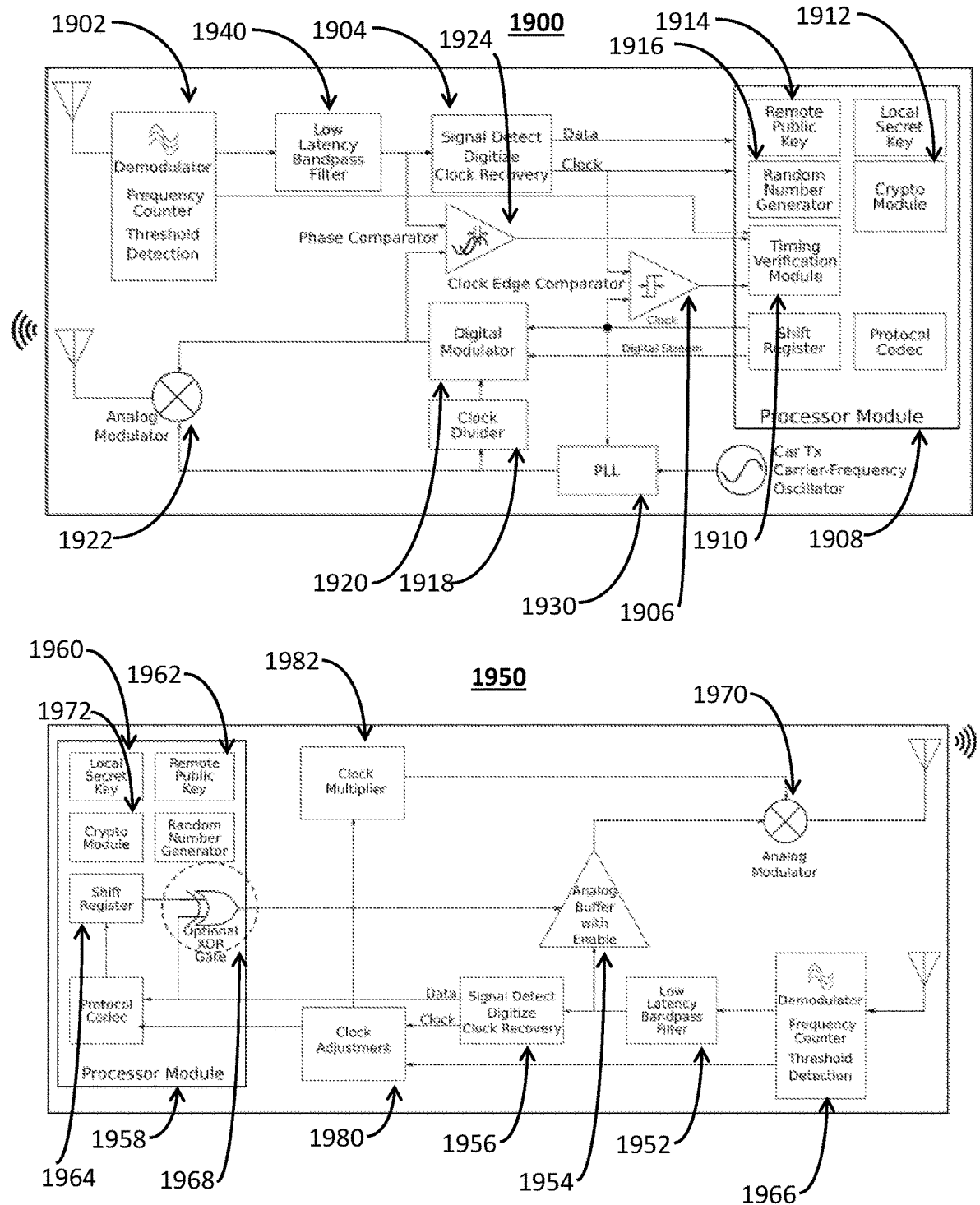
FIG. 11 illustrates exemplary modules for device authentication.

While exemplary modules for device authentication have been described, one of skill in the art will appreciate that other configurations are possible. FIG. 11 illustrates other exemplary modules for device authentication. Module 1900 illustrates an example of a module built into a first device (e.g., built into a vehicle) and module 1950 illustrates an example of a module built into a second device (e.g., built into an electronic key). Module 1900 includes all of the elements of module 900 as previously described unless otherwise stated. Like elements have been identified with like reference numerals increased by "1000".

Demodulator 1902 of module 1900 receives a modulated signal and demodulates the signal. Low latency bandpass filter 1940 filters the demodulated signal. Digitizer 1904 receive the filtered signal from the filter 1940 and digitizes that signal. Propagation delay comparator 1906 receives the signal and determines propagation delay (i.e., time-of-flight). In some implementations, phase comparator 1924 is used to determine time-of-flight (e.g., based on phase shift of the return signal).

Processor module 1908 is an example of control circuitry discussed in this application. The processor module 1908 receives the propagation delay results and the digitized signal. The processor module 1908 uses the timing verification module 1910 to determine whether the second device is within a threshold distance of the first device. The timing verification module 1910 receives the demodulated signal from the demodulator 1902. The processor module 1908 determines whether the second device is within a threshold distance of the first device based on a determined number of cycles of the first signal 1002 present between cycles of the baseband.

In some implementations, the timing verification module 1910 counts the peaks 1006, 1016 due to constructive interference between the signals 1002, 1012.

In some implementations, the processor module 1908 determines whether the second device is within a threshold distance of the first device based on output from the propagation delay comparator 1906.

Module 1900 transmits on HF1 and Module 1950 receives and demodulates it, extracting LF1. Module 1950 modulates LF1 on the HF2 carrier frequency at analog modulator 1970 and transmits the modulated signal to module 1900, which demodulates the signal, extracting LF1, using demodulator 1902.

Demodulator 1966 demodulates the signal coming into the module 1950. The demodulated signal is received by clock adjuster 1980. Clock adjuster 1980 adjusts a transmitting clock signal based on a received clock signal detected by digitizer 1956. The adjusted signal is received by clock multiplier 1982. Clock multiplier 1982 multiplies the adjusted signal such that the second modulation frequency is a precise integer multiple of the baseband. The multiplied clock signal is received by the analog modulator 1970. The analog modulator 1970 modulates LF1 on the HF2 carrier frequency, generated within module 1950, as per the multiplied clock signal received from the clock multiplier 1982. In this manner, the second modulation frequency is a precise integer multiple of the baseband.

Various aspects of the subject matter and the functional operations described in this disclosure can be implemented in digital electronic circuitry, or in software, firmware, or hardware, including the structures disclosed in this specification and their structural equivalents, or in combinations of one or more of them. In addition, aspects of the subject matter described in this disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous.

A number of embodiments have been described. Nevertheless, it will be understood that various modifications may be made without departing from the spirit and scope of the invention. For example, some of the steps described above may be order independent, and thus can be performed in an order different from that described.

Accordingly, other implementations are within the scope of the claims.

The invention claimed is:

1. A system comprising:
a transceiver; and
control circuitry coupled to the transceiver, the control circuitry operable to:
generate, on a first device, an authentication sequence;
encrypt the authentication sequence;
transmit, using the transceiver, the encrypted authentication sequence to a second device;
receive, in the transceiver from the second device, an encrypted return sequence;
decrypt the encrypted return sequence;
receive, sequentially a first plurality of portions of the unencrypted authentication sequence and transmit, sequentially to the second device, a second plurality of portions of the unencrypted return sequence, wherein transmitting sequentially and receiving sequentially comprises:
determining, based on a time-of-flight measurement for each portion of the first plurality of portions, whether the second device is within a threshold distance of the first device;
comparing each portion of the first plurality of portions to a corresponding portion in the authentication sequence; and
determining whether each portion of the first plurality of portions matches the corresponding portion in the authentication sequence; and
based on determining that each portion of the first plurality of portions matches a corresponding portion in the authentication sequence and the second device is within the threshold distance of the first device, generate an authentication success indication.

2. The system of claim 1, wherein the control circuitry is further operable to generate an authentication failure indication based on determining that the second device is not within the threshold distance of the first device.

3. The system of claim 1, wherein the control circuitry is further operable to transmit one of the authentication failure indication or the authentication success indication to the second device.

4. The system of claim 1, wherein the control circuitry is further operable to generate an authentication failure indication based on determining that each portion of the first plurality of portions does not match the corresponding portion in the authentication sequence.

5. The system of claim 1, wherein the control circuitry is operable to generate the authentication sequence by:
generating an alphanumeric sequence; and
converting the alphanumeric sequence into a first bit string; wherein the control circuitry is operable to receive, sequentially from the second device, the plurality of portions of the return sequence by receiving a second bit string.

6. The system of claim 1, wherein the control circuitry is operable to pair the first device with the second device by:
generating, on the first device, a second authentication sequence;
transmitting the second authentication sequence to the second device; and
storing the second authentication sequence at the first device; wherein the control circuitry is operable to compare each portion to a corresponding portion in the authentication sequence by:
calculating an exclusive or ("XOR") value of each portion of the first plurality of portions and a corresponding portion of the second authentication sequence; and
comparing the XOR value with the corresponding portion of the authentication sequence.

7. A system comprising:
a transceiver; and
control circuitry coupled to the transceiver, the control circuitry operable to:
encrypt, at a first device with a public key of a second device, a first authentication sequence generated on the first device;
transmit, using the transceiver, the encrypted first authentication sequence to the second device;
receive, from the second device in the transceiver, a second authentication sequence, wherein the second authentication sequence is encrypted with a public key of the first device;
decrypt, using a private key of the first device, the second authentication sequence;
receive, sequentially on a first modulation frequency a first plurality of bits of the unencrypted first authentication sequence and transmit, sequentially to the second device on a second modulation frequency, a second plurality of bits of the unencrypted second authentication sequence, wherein transmitting sequentially and receiving sequentially comprises:
transmitting, to the second device for each bit of the second plurality of bits, a clock signal and a data signal;
receiving a corresponding clock signal from the second device;
determining whether the corresponding clock signal has a corresponding data signal;
in response to determining that the corresponding clock signal has the corresponding data signal, setting a return bit of the first plurality of bits to a value of one;
in response to determining that the corresponding clock signal does not have the corresponding data signal, setting the return bit of the first plurality of bits to a value of zero;
determining an estimated time-of-flight of each return bit of the first plurality of bits based on one or more of a phase difference or propagation delay;
determining, based on the estimated time-of-flight, that the second device is within the threshold distance of the first device;
comparing each return bit of the first plurality of bits to a corresponding bit of the first authentication sequence;
determining, based on comparing each return bit of the first plurality of bits to the corresponding bit of the first authentication sequence, whether each return bit of the first plurality of bits matches the corresponding bit of the first authentication sequence;
and based on determining that each return bit of the first plurality of bits matches the corresponding bit of the first authentication sequence and the second device is within the threshold distance of the first device, generate an indication of a successful authentication.

8. The system of claim 7, wherein the control circuitry is operable to pair the first device with the second device by:
generating a first private key and a first public key;
storing, at the first device, the first public key; and
storing, at the second device, the first private key.

9. The system of claim 7, wherein the control circuitry is further operable to transmit a presence signal with the identification of the first device.

10. The system of claim 7, wherein the control circuitry is operable to compare the return bit of the first plurality of bits to the corresponding bit of the first authentication sequence by:
calculating an XOR value between the return bit of the first plurality of bits and a corresponding bit in the second plurality of bits; and
comparing the XOR value with the corresponding bit received from the second device.

11. The system of claim 7, wherein the control circuitry is operable to determine the estimated time-of-flight by at least one of:
determining a number of cycles of the first plurality of bits on the first modulation frequency present between cycles of a baseband;
determining a number of cycles of the second plurality of bits on the second modulation frequency present between cycles of the baseband; and
determining a number of features of an interference signal of the first plurality of bits on the first modulation frequency and the second plurality of bits on the second modulation frequency.

12. A method comprising:
generating, on a first device, an authentication sequence;
encrypting the authentication sequence;
transmitting, using a transceiver, the encrypted authentication sequence to a second device;
receiving, in the transceiver from the second device, an encrypted return sequence;
decrypting the encrypted return sequence;
receiving, sequentially a first plurality of portions of the unencrypted authentication sequence and transmit, sequentially to the second device, a second plurality of portions of the unencrypted return sequence, wherein transmitting sequentially and receiving sequentially comprises:
determining, based on a time-of-flight measurement for each portion of the first plurality of portions, whether the second device is within a threshold distance of the first device;
comparing each portion of the first plurality of portions to a corresponding portion in the authentication sequence; and
determining whether each portion of the first plurality of portions matches the corresponding portion in the authentication sequence; and
based on determining that each portion of the first plurality of portions matches a corresponding portion in the authentication sequence and the second device is within the threshold distance of the first device, generate an authentication success indication.

13. The method of claim 12, further comprising generating an authentication failure indication based on determining that the second device is not within the threshold distance of the first device.

14. The method of claim 12, further comprising transmitting one of the authentication failure indication or the authentication success indication to the second device.

15. The method of claim 12, further comprising generating an authentication failure indication based on determining that each portion of the first plurality of portions does not match the corresponding portion in the authentication sequence.

16. The method of claim 12, wherein generating the authentication sequence comprises:
generating an alphanumeric sequence; and
converting the alphanumeric sequence into a first bit string; wherein receiving, sequentially from the second device, the plurality of portions of the return sequence comprises receiving a second bit string.

17. The method of claim 12, wherein pairing the first device with the second device comprises:
generating, on the first device, a second authentication sequence;
transmitting the second authentication sequence to the second device; and
storing the second authentication sequence at the first device.

18. The method of claim 17, wherein comparing each portion to a corresponding portion in the authentication sequence comprises:
calculating an exclusive or ("XOR") value of each portion of the first plurality of portions and a corresponding portion of the second authentication sequence; and
comparing the XOR value with the corresponding portion of the authentication sequence.

19. A non-transitory computer readable medium having computer program code stored thereon, the computer program code, when executed by a processor, performing the method of claim 12.

* * * * *